United States Patent
Villegas et al.

(10) Patent No.: US 11,163,538 B2
(45) Date of Patent: Nov. 2, 2021

(54) PACKAGE CONVERSIONS FOR PROCEDURAL LANGUAGE EXTENSIONS

(71) Applicant: Oracle International Corporation, Redwood Shores, CA (US)

(72) Inventors: Juan Francisco Calvillo Villegas, Chihuahua (MX); Jayakrishnan Radhakrishnan, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/742,742

(22) Filed: Jan. 14, 2020

(65) Prior Publication Data

US 2021/0216286 A1    Jul. 15, 2021

(51) Int. Cl.
*G06F 9/44* (2018.01)
*G06F 8/30* (2018.01)

(52) U.S. Cl.
CPC .................... *G06F 8/315* (2013.01)

(58) Field of Classification Search
CPC .............. G06F 8/315; G06F 8/22; G06F 8/24
USPC ......................... 717/116, 108, 111
See application file for complete search history.

(56) References Cited

U.S. PATENT DOCUMENTS

| | | | | |
|---|---|---|---|---|
| 2002/0138582 A1* | 9/2002 | Chandra | .............. | G06Q 10/107 709/206 |
| 2003/0208505 A1* | 11/2003 | Mullins | ................. | G06F 16/289 |
| 2004/0021679 A1* | 2/2004 | Chapman | ............. | G05B 19/042 715/700 |
| 2004/0103100 A1* | 5/2004 | Levine | ..................... | G06F 16/20 |
| 2004/0168150 A1* | 8/2004 | Ziv | .......................... | G06F 9/451 717/116 |
| 2005/0005261 A1* | 1/2005 | Severin | .................... | G06F 8/316 717/108 |
| 2005/0027734 A1* | 2/2005 | MacLeod | .............. | G06F 16/289 |
| 2009/0113387 A1* | 4/2009 | Ziegler | .............. | G06Q 30/0244 717/109 |

(Continued)

OTHER PUBLICATIONS

Bridging EMF applications and RDF data sources author: G Hillairet et al, published on 2008.*

(Continued)

*Primary Examiner* — Chameli Das
(74) *Attorney, Agent, or Firm* — Kilpatrick Townsend & Stockton LLP

(57) ABSTRACT

An existing package definition that statically accesses data sources may be used to generate a new definition of the package that dynamically selects between available data sources at runtime. Read-only operations in the new package can be replaced with parameterized views that select between data sources using a session variable. Data manipulation code in the existing package definition can be moved from the package to a new object type. The new definition of the package may keep the same public interface, but the function/procedure definitions can call corresponding functions/procedures in the new object type. Data manipulation code in these functions in the object can be moved to new member functions that separate data manipulation code from data processing code. Child object types can be defined for each data source that override these member functions to access different data sources.

19 Claims, 23 Drawing Sheets

(56) References Cited

U.S. PATENT DOCUMENTS

| | | | | |
|---|---|---|---|---|
| 2009/0187610 | A1* | 7/2009 | Guo | G06F 19/00 |
| 2012/0059862 | A1* | 3/2012 | Brooks | G06F 16/972 |
| | | | | 707/803 |
| 2013/0346725 | A1* | 12/2013 | Lomet | G06F 16/2246 |
| | | | | 711/206 |
| 2014/0013246 | A1* | 1/2014 | Beechuk | G06Q 50/01 |
| | | | | 715/753 |
| 2014/0047420 | A1* | 2/2014 | Pizlo | G06F 11/3452 |
| | | | | 717/145 |
| 2016/0335365 | A1* | 11/2016 | Grigoreva | G06F 16/954 |
| 2019/0273655 | A1* | 9/2019 | Jones | G06F 9/44568 |
| 2020/0050968 | A1* | 2/2020 | Lee | G06N 20/00 |
| 2021/0064613 | A1* | 3/2021 | Fender | G06F 16/2438 |

OTHER PUBLICATIONS

MongoDB vs Oracle—database comparison ; author: A Boicea et al, published on 2012.*

Title: Movemine: Mining moving object databases ; author: Z Li et al, published on 2010 source: ACM.Org.*

Title:Tiresias: the database oracle for how-to queries, author: A Meliou, et al, published on 2012: Source ACM SIGMOD International.*

\* cited by examiner

Context API

Package Specification

```
create or replace PACKAGE my_context_api AS

PROCEDURE set_parent_mode;
    PROCEDURE set_child_mode;

END my_context_api;
```
402

Package Body

```
create or replace PACKAGE BODY my_context_api AS

PROCEDURE set_parent_mode IS
    BEGIN
        DBMS_SESSION.set_context('my_context', 'mode', 'P');
    END set_parent_mode;

PROCEDURE set_child_mode IS
    BEGIN
        DBMS_SESSION.set_context('my_context', 'mode', 'C');
    END set_child_mode;

END my_context_api;
```
404
410
412

Create Context Statement

```
CREATE OR REPLACE CONTEXT my_context USING my_context_api;
```
406

FIG. 4

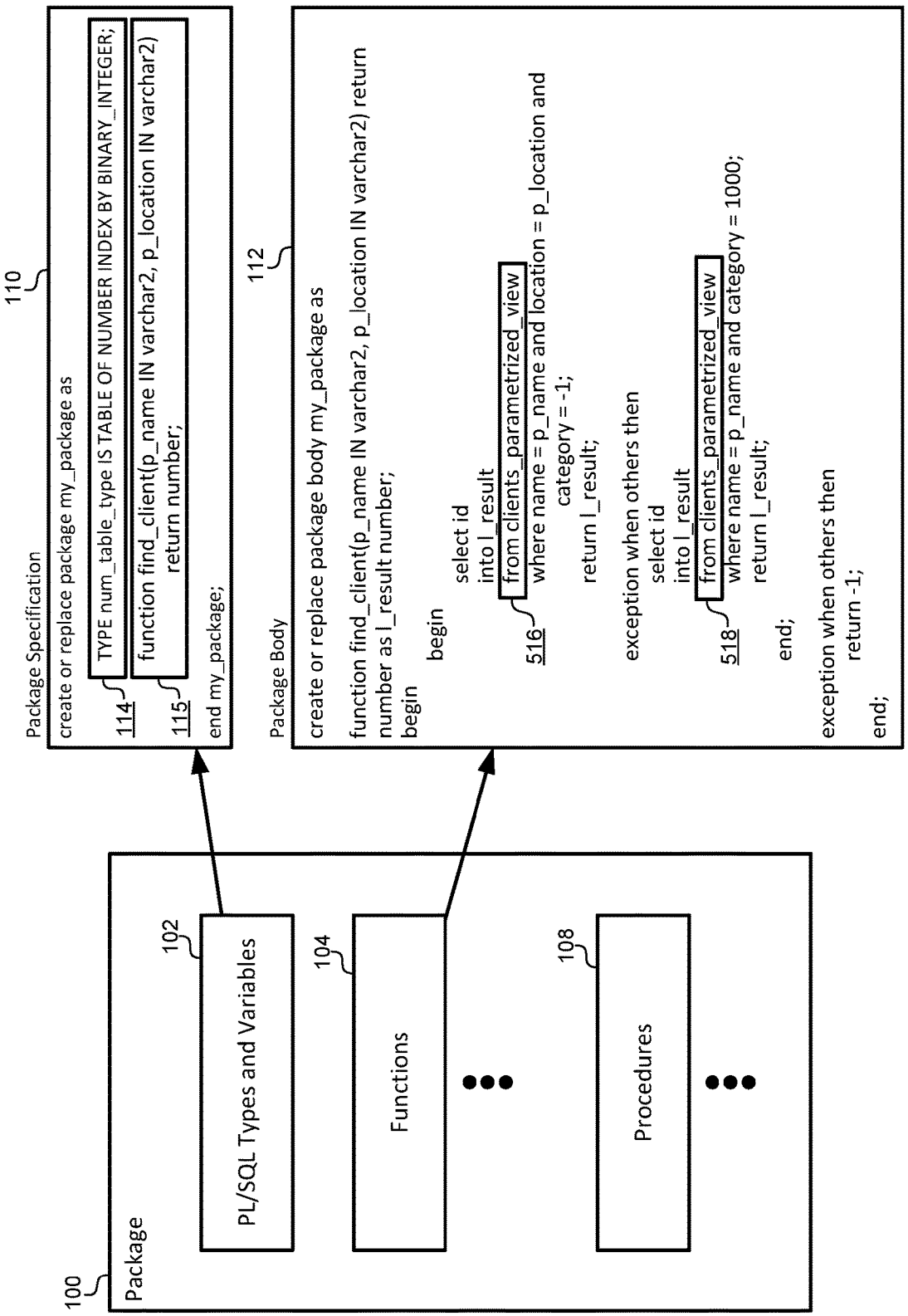

Original Package Specification     110

```
create or replace package my_package as
    TYPE num_table_type IS TABLE OF NUMBER INDEX BY BINARY_INTEGER;    — 114
    procedure insert_client(p_name IN clients.name%TYPE, p_location IN
    clients.location%TYPE, p_top_client_ids IN num_table_type);    — 117
    function find_client(p_name IN varchar2, p_location IN varchar2)
    return number;    — 115
end my_package;
```

Object Type Specification     1002

```
create or replace TYPE my_package_obj FORCE AS OBJECT
(
    g_dummy_variable NUMBER,                                              — 1003 constructor function my_package_obj return self as result, member procedure insert_client(p_name IN varchar2, p_location IN      — 1004
    varchar2),
    member function find_client(p_name IN varchar2, p_location IN
    varchar2) return number, member procedure insert_client_dml_1 (p_id IN number, p_name IN       — 1006
    varchar2, p_location IN varchar2, p_category IN number),
    member procedure insert_client_dml_2 (p_name IN varchar2,
    p_location IN varchar2, p_category IN number)
) NOT FINAL;
```

FIG. 10

Parent Object Body                                        1102

```
member function find_client(p_name IN varchar2, p_location IN varchar2) return number as
        l_result number;
begin
        begin
                select id
                into l_result
           ┌─ from clients_parametrized_view
      1104 ┘  where name = p_name and location = p_location and category = -1;
                return l_result;

exception when others then
                select id
                into l_result
           ┌─ from clients_parametrized_view
      1105 ┘  where name = p_name and category = 1000;
                return l_result;
        end;
exception when others then
        return -1;
end;
```

FIG. 11

Original Package

Original Package Body                                              1250

```
procedure insert_client(p_name IN clients.name%TYPE, p_location IN clients.location%TYPE,
p_top_client_ids IN num_table_type ) as
        l_count number;
1224 ┤  l_category clients.category%TYPE := -1;
        l_name clients.name%TYPE;
begin
        select count(*)
        into l_count
        from clients
1226 ┘  where name = p_name;

for i in p_top_client_ids.FIRST .. p_top_client_ids.LAST
1232 ┘  loop
                select name into l_name from clients where id = i;
                if l_name = p_name then
                        l_category := 1000;
                        exit;
                end if;
        end loop;

if l_count < 0 then
                insert into clients
                (id, name, location, category)
1228 ─┤         values
                (l_count + 1, p_name, p_location, l_category);
        else
                update clients
1230 ─┤         set location = p_location, category = l_category
                where name = p_name;
        end if;
end;
end my_package;
```

FIG. 12A

Parent Object Type (cont)

Parent Object Body    1102

```
member procedure insert_client(p_name IN varchar2, p_location IN varchar2) as
        l_count number;
1204 ⎰  l_category clients_parametrized_view.category%TYPE := -1;
     ⎱  l_name clients_parametrized_view.name%TYPE;
     begin
             select count(*)
             into l_count
1206 ⎯  from clients_parametrized_view
             where name = p_name;
             for i in
1212 ⎯  MY_PACKAGE_NEW.g_p_top_client_ids.FIRST ..
             MY_PACKAGE_NEW.g_p_top_client_ids.LAST
             loop
                     select name into l_name from
                     clients_parametrized_view where id = i;
                     if l_name = p_name then
                             l_category := 1000;
                                 exit;
                     end if;
             end loop;
             if l_count < 0 then
1208 ⎯  insert_client_dml_1(l_count + 1, p_name,
                     p_location, l_category);
             else
1210 ⎯  insert_client_dml_2(p_name, p_location,
                     l_category);
             end if;
     end;
```

FIG. 12B

Parent Object Type (cont)

Parent Object Body 1102

```
member procedure insert_client_dml_1 (p_id IN number, p_name IN varchar2, p_location IN
varchar2, p_category IN number) as
    begin
1320 ─── insert into clients_parent
        (id, name, location, category)
        values
        (p_id, p_name, p_location, p_category);
    end;

member procedure insert_client_dml_2 (p_name IN varchar2, p_location IN varchar2,
p_category IN number) as
    begin
1322 ─── update clients_parent
        set location = p_location, category = p_category
        where name = p_name;
    end;
end;
```

FIG. 13

Child Object Type

1500

Object Type Specification

1502

```
create or replace TYPE my_package_obj_child FORCE under my_package_obj
(
        constructor function my_package_obj_child return self as result, OVERRIDING member procedure insert_client_dml_1 (p_id IN number,
        p_name IN varchar2, p_location IN varchar2, p_category IN number), OVERRIDING member procedure insert_client_dml_2 (p_name IN
        varchar2, p_location IN varchar2, p_category IN number)
) NOT FINAL;
```

Object Body

1504

```
create or replace TYPE BODY my_package_obj_child as

CONSTRUCTOR FUNCTION my_package_obj_child RETURN SELF AS RESULT IS
        BEGIN
                RETURN;
        END my_package_obj_child;

OVERRIDING member procedure insert_client_dml_1 (p_id IN number, p_name
        varchar2, p_location IN varchar2, p_category IN number) as
        begin
                insert into clients_child
1510            (id, name, location, category)
                values
                (p_id, p_name, p_location, p_category);
        end;

OVERRIDING member procedure insert_client_dml_2 (p_name IN varchar2
        p_location IN varchar2, p_category IN number) as
        begin
                update clients_child
1512            set location = p_location, category = p_category
                where name = p_name;
        end;
end;
```

FIG. 15

New Package Specification

Package Specification create or replace package my_package_new as

TYPE num_table_type IS TABLE OF NUMBER INDEX BY BINARY_INTEGER;

g_p_top_client_ids num_table_type;

procedure insert_client(p_name IN clients.name%TYPE, p_location IN clients.location%TYPE, p_top_client_ids IN num_table_type);

function find_client(p_name IN clients.name%TYPE, p_location IN clients.location%TYPE) return number;

end my_package_new;

New Package Body

New Package Body　　　　　　　　　　　　　　1902

```
create or replace package body my_package_new as g_obj MY_PACKAGE_OBJ;

procedure create_object AS
            l_obj_mode VARCHAR2(1) := sys_context('my_context', 'mode');
    begin
            IF g_obj IS NULL THEN
                    if l_obj_mode = 'P' THEN
                            g_obj := MY_PACKAGE_OBJ();
                    elsif l_obj_mode = 'C' THEN
                            g_obj := MY_PACKAGE_OBJ_CHILD();
                    else
                            raise_application_error( -20001, 'No mode selected.' );
                    end if;
            end if;
    end;

procedure insert_client(p_name IN clients.name%TYPE, p_location IN
    clients.location%TYPE, p_top_client_ids IN num_table_type ) as
    begin
            create_object;
            g_p_top_client_ids := p_top_client_ids;
            g_obj.insert_client(p_name, p_location);
    end;

function find_client(p_name IN clients.name%TYPE, p_location IN
    clients.location%TYPE) return number as
    begin
            create_object;
            return g_obj.find_client(p_name, p_location);
    end;

end my_package_new;
```

1910 — (create_object procedure block)
1912 — (insert_client procedure block)
1914 — (find_client function block)

FIG. 19

PACKAGE CONVERSIONS FOR PROCEDURAL LANGUAGE EXTENSIONS

BACKGROUND

In the industry, the expansion of the Cloud service model has changed customer expectations regarding software releases. Whether releases are delivered yearly or after several months, customers expect their software to continue improving in a continuous delivery model. However, constant improvements mean an increased probability of regressing the software's existing functionality. Regressions can affect the customer and the software company in multiple ways, including harming their corporate images, causing direct economic damages, and generating possible legal issues. Software complexity and maintenance difficulty are directly related to regressions. Some software architectural patterns, like the Model View Controller, have recognized that separating the data from the software logic eases the software maintenance burden. Programming paradigms like the object-oriented programming offer solutions to produce more maintainable software as well by promoting loosely coupled code. However not all programming languages or programming language extensions can natively take advantage of programming paradigms that separate data access and data processing code.

BRIEF SUMMARY

An existing package definition that statically accesses data sources may be used to generate a new definition of the package that dynamically selects between available data sources at runtime. Read-only operations in the new package can be replaced with parameterized views that select between data sources using a session variable. Data manipulation code in the existing package definition can be moved from the package to a new object type. The new definition of the package may keep the same public interface, but the function/procedure definitions can call corresponding functions/procedures in the new object type. Data manipulation code in these functions in the object can be moved to new member functions that separate data manipulation code from data processing code. Child object types can be defined for each data source that override these member functions to access different data sources.

A tool may parse the existing package definition to identify functions, variables, and other programming constructs. The new package definition may copy any public functions and/or variables that were previously publicly available such that any dependencies on the package will remain intact. However, instead of simply copying the function/procedure code into the function/procedure definitions in the new package, this code can be copied to corresponding function/procedure definitions in a new object type. The function/procedure definitions in the new package may translate any parameters and/or returns into variables that are supported by the query language, then call the corresponding functions/procedures from the object. Any parameters that are not supported by the query language can be stored in global variables that can be accessed by the object.

The code for the object may include function/procedure definitions that are copied from the original package definition. However, any data manipulation code that manipulates data at the data source may be identified and moved into new member functions/procedures within the object. This effectively separates the data manipulation code from the data processing code such that changes can be made to the data manipulation code without affecting the rest of the program. In place of the data manipulation code, the function/procedures within the object can instead call the new member functions/procedures to insert, update, delete, etc., data at the selected data source.

To allow for runtime selection of data sources for data manipulation operations, a child object type may be generated for each available data source. The child objects may override the new member functions/procedures that manipulate the data from the parent object. In the new package definition, the code can select between various data sources by instantiating the corresponding object type. The object type can be determined using a session variable or other construct that can be set at runtime to dynamically instantiate the correct object type based on the data source to be used.

For read-only operations, parameterized views can be used that generate a view of the selected data source at runtime. The session variable may be used in a conditional statement when creating the parameterized view such that the view corresponds to the desired combination of data sources. In the functions/procedures in the new object definition, any read-only references to the original data source can be replaced with references to the new parameterized view.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4 illustrates a context API that may be used to manipulate session variables, according to some embodiments.

FIG. 5 illustrates changes that may be made to the existing code to allow for runtime selection of read-only data sources, according to some embodiments.

FIG. 10 illustrates an original package specification and a new object type specification, according to some embodiments.

FIG. 11 illustrates a portion of the first (e.g., parent) object body that includes a definition for the member functions of the object, according to some embodiments.

FIG. 12A illustrates an excerpt of code from the original package body that includes a procedure for inserting new data into the data source, according to some embodiments.

FIG. 12B illustrates code generated for the member procedure in the object body for inserting data into the data source, according to some embodiments.

FIG. 13 illustrates an example of new member procedures that may be automatically generated to handle the data manipulation operations, according to some embodiments.

FIG. 15 illustrates code that may be automatically generated for various child object types, according to some embodiments.

FIG. 17 illustrates an example of a new package specification generated for compatibility with the new parent/child objects, according to some embodiments.

FIG. 19 illustrates an example of a package body that is automatically generated to instantiate and call object member functions according to a session variable, according to some embodiments.

DETAILED DESCRIPTION

Figure 1:
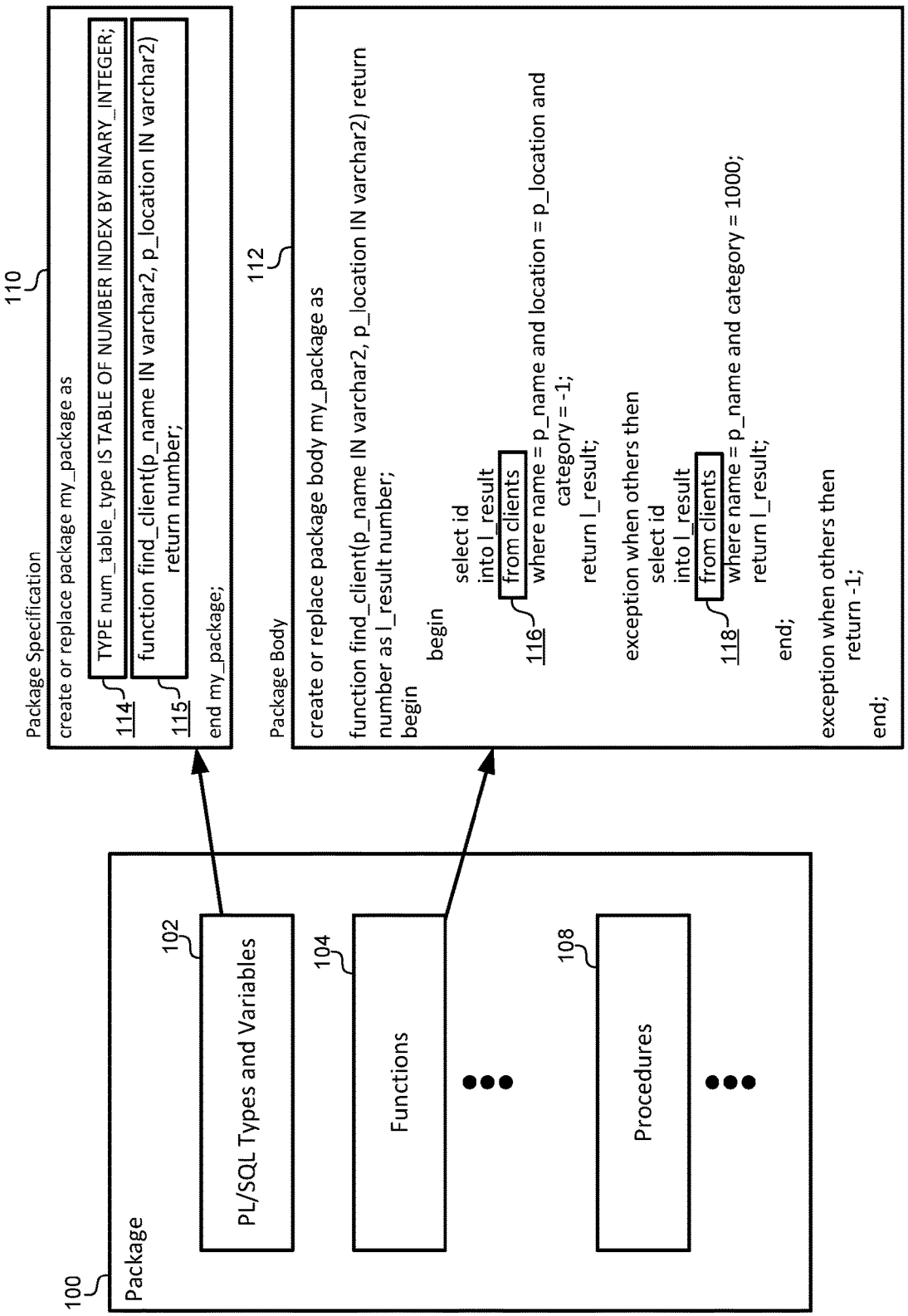
FIG. 1 illustrates a structure of an existing PL/SQL program, according to some embodiments.

Described herein are embodiments for parsing an existing package definition that statically accesses data sources to generate a new definition of the package that dynamically selects between available data sources at runtime. Read-only operations in the new package can be replaced with parameterized views that select between data sources using a session variable. Data manipulation code in the existing package definition can be moved from the package to a new object type. The new definition of the package may keep the same public interface, but the function/procedure definitions can call corresponding functions/procedures in the new object type. Data manipulation code in these functions in the object can be moved to new member functions that separate data manipulation code from data processing code. Child object types can be defined for each data source that override these member functions to access different data sources.

The Structured Query Language (SQL) is a domain-specific language used for programming interactions with data held in a relational database management system (RDBMS). The scope of SQL includes data query, data definition (schema modification and creation), data manipulation (insert, update, and delete), and data access control. Essentially, SQL is a declarative language that includes limited procedural elements. For example, SQL is often used to define queries that may be executed against the RDBMS to retrieve subsets of data from a database. SQL excels in data access, particularly for structured data using a defined schema.

However, because SQL is a declarative language designed for accessing data, it does not natively support many of the procedural programming language constructs that are useful in processing and manipulating the data after it is retrieved from the database. Some language extensions have been designed for the SQL and other query languages that add procedural elements to make these query languages more useful when processing retrieved data. For example, the Procedural Language for SQL (PL/SQL) includes procedural language elements, such as conditions and loops. It allows the declaration of constants and variables, procedures and functions, types and variables of those types, and triggers. It can handle exceptions, such as run-time errors, and it supports arrays and/or collections. Some of the latest versions of PL/SQL include features commonly associated with formal object-oriented languages.

In order for code to be easily upgraded over the software lifecycle, the code generally should be written such that data access code and data processing code are separated as much as possible. This allows changes to be made to the data source and allows data access to be made independent of the data processing code. For example, to change a target database, the code that accesses the database should be separated from the code that processes the data retrieved from the database. Upgrading this code then only requires the software designer to change the target database code in isolated locations in the program instead of making changes that involve the data processing code. This minimizes the number of errors that may be introduced when software is upgraded.

The nature of the PL/SQL language is to handle the data processing on the data that comes from SQL databases. However, the syntax of the PL/SQL language naturally lends itself to mixing the data processing code with the data access code. Beyond the syntax itself, the nature of handling data being queried leads to the mix of these two code types. For example, SQL statements retrieving code from databases are often tightly coupled with the procedural code that processes the data retrieved from the databases. While this is a simple solution when initially writing the code, it leads to problems later on when the code is upgraded and the data access code and/or the data processing code is changed. Additionally, while some object-oriented constructs are available in PL/SQL, the functionality is limited in comparison to other languages. These constructs have been added as the language has evolved because it was not initially designed to handle object-oriented programming complexities. Although there is some limited functionality, PL/SQL is not fundamentally structured to separate data from code that operates on the data.

When the software requirements lead to using the PL/SQL language, the nature of the language makes some of these patterns and principles of separating code from data difficult to adopt. If the development team is not experienced in techniques that promote the code reusability in PL/SQL, it could lead to maintenance issues. Traditionally, PL/SQL programming is written in PL/SQL packages and follows a structured programming paradigm, relying on flow control statements, loops, and subprograms, to define the program logic in contrast with the object-oriented paradigm that instead relies on class hierarchies, object types, interfaces, instances, and other concepts to allow greater flexibility, code reusability, and ease of maintenance. In the industry, it is common to use PL/SQL programs to handle data-related operations with SQL-language constructs integrated within these operations to retrieve database data. Given the way PL/SQL is normally used, it is common to see large structured PL/SQL programs where the data and the program logic are tightly coupled. This reduces the possibility of reusing the code without wholesale changes and makes the code difficult to be adapted for new requirements.

The embodiments described herein are not focused on designing new programs, but instead focus on transforming existing code to be more reusable by separating the data access code from the data processing code. Essentially, this separates the data from the code processing the data. This addresses scenarios where PL/SQL programs currently used in production are presenting challenges as they are adapted to new requirements. Thus, these embodiments target existing PL/SQL programs that are tightly coupled with a database rather than new programs. These embodiments transform existing packages into new code that utilizes the limited object-oriented programming features of the PL/SQL language.

Before describing these embodiments in detail, the techniques described herein can be contrasted with existing solutions. First, the embodiments described herein may be contrasted with solutions that simply modify the existing code to include new logic on top of the existing design. This leads to large and unmanageable programs and introduces a variety of issues depending on how large the required changes become. Over time, programs using these techniques become so complex and unorganized in their code structure that they rapidly become unmanageable.

The embodiments described herein may also be contrasted with solutions that simply duplicate part of the code to perform different actions. These solutions created copies of the code and modified it to solve new requirements while keeping old versions of the code to satisfy the original requirements. However, going forward, both versions of the code needed to be maintained in parallel. If modifications were substantial, or if the development teams were different for the parallel modifications, the two versions could become very different over time. Double maintenance of the same code requires twice the work and increases the probability that the functionality of the two copies diverges over time.

The embodiments described herein may also be contrasted with solutions that redesign the application to maintain the old functionality while incorporating the new requirements. These solutions required a complete redesign in most cases, especially for critical programs in production. This option is only feasible when no other alternatives are available. While the redesign does allow more separation of data and code, it requires a tremendous amount of overhead each time a new changes are introduced.

In contrast to these previous solutions, the embodiments described herein can access and parse an existing PL/SQL program in a package. After identifying data access code and data processing code, these embodiments can automatically generate a new package with a corresponding object-oriented class hierarchy that separates the data access from the data processing.

Data access code can be generally divided into two types of code. The first type of data access code involves reading data from a data source, such as a database. Reading data from the data source typically does not require changes to be made to data in the data source, but rather only provides a view of data objects in the data source. The second type of data access code involves manipulating data in the data source. This may include operations such as update, insert, delete, and so forth, that change data at the data source. The embodiments described herein may handle these two types of data access code differently. Therefore, some embodiments can be subdivided into two macro-steps that (1) introduce constructs that separate the read-only data access code from the data processing code, and (2) generate new packages, types/objects, and inherited types/objects that separate the update data access code from the data processing code. This disclosure may focus first on the read-only data access code, followed by the update data access code.

To handle the read-only data access code, some embodiment may first generate a new version of an existing PL/SQL package that will work with different database tables. By using "parameterized views," different tables or views can be used for read operations within the program code. This can be done without overwriting every query in the child packages, and instead exposes the tables to be queried based on a session variable.

FIG. 1 illustrates a structure of an existing PL/SQL program, according to some embodiments. Most PL/SQL programs are encapsulated in a package 100. A package 100 is a schema object that contains definitions for a group of related functionalities. A package may include variables, constants, exceptions, procedures, functions, and subprograms. Typically, a package may include a package specification 110 and a package body 112. The package specification 110 may include any of the PL/SQL types and variables 102 that are used within the package body 112. The package specification 110 may also include declarations of any functions 104 and/or procedures 108 that are defined in the package body 112. The package body 112 may include the actual code that implements the functions 104 and/or procedures 108 declared in the package specification 110.

In the example of FIG. 1, the package specification 110 declares a PL/SQL type 114 for a table of numbers indexed by a binary integer. This is a PL/SQL specific type that might not be supported in native SQL code alone. This type 114 may be used by a procedure for inserting data into the database that is described in detail later in this disclosure. The package specification 110 also includes the declaration 115 of a function for finding data in a client database. This example and the other examples described below may use a database that stores client information. The package may include functions and procedures that read data from a client database and/or update data in the client database. The procedure in the declaration 115 for the "find_client" procedure allows the code to insert a new client into the "clients" database.

The package body 112 includes a definition of the find_client( ) function that receives the name of a client and a location of the client and returns a numeric indicator of where that client exists in the database. The name of the database table is "clients," and it is accessed directly using an SQL select statement in the data processing code of the function. For example, code 116 directly names the "clients" database table when finding a location in the database matching the name/location in the function parameters. Similarly, code 118 includes a similar name of the "clients" database table when handling an exception generated when the specified client is not found. In both of these segments of code 116, 118, the reference to the data source is integrated with the code processing the data.

Figure 2:
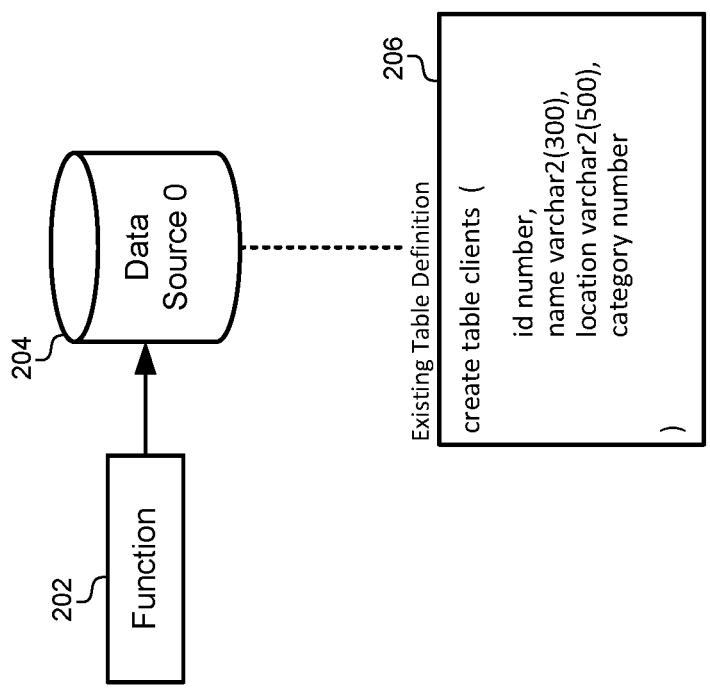
FIG. 2 illustrates a functional diagram of the existing PL/SQL code structure for accessing data in a data source, according to some embodiments.

FIG. 2 illustrates a functional diagram of the existing PL/SQL code structure for accessing data in a data source, according to some embodiments. As described above, a function 202 may directly access a data source 204. The function 202 may access the data source 204 using "select" or other similar SQL commands, and the results may be processed by the surrounding procedural code in the PL/SQL. Accessing the data source 204 may use a table definition 206. As described above, this example accesses a "clients" table in a database. The code defines the "clients" table with columns for a numerical identifier, a name, a location, and a category. As illustrated above in FIG. 1, the function 202 can access the data source 204 by using the "clients" table definition 206.

Future code upgrades/alterations may use alternative or additional data sources in place of the "clients" table. Previously, the code in the PL/SQL needed to be altered to choose between various data sources. However, this solution is problematic in that it required manual alterations to every instance in the code that reference the "clients" table. The solution was also not a dynamic one, in that it required static changes to the code that could not be changed at runtime. The embodiments described herein solve this problem by using a session variable in creating a composite view of one or more alternative data sources. The session variable can be stored in a runtime context that is altered or set at runtime, thus allowing the program to dynamically change between data sources without requiring alterations to the code between runtime sessions.

Figure 3:
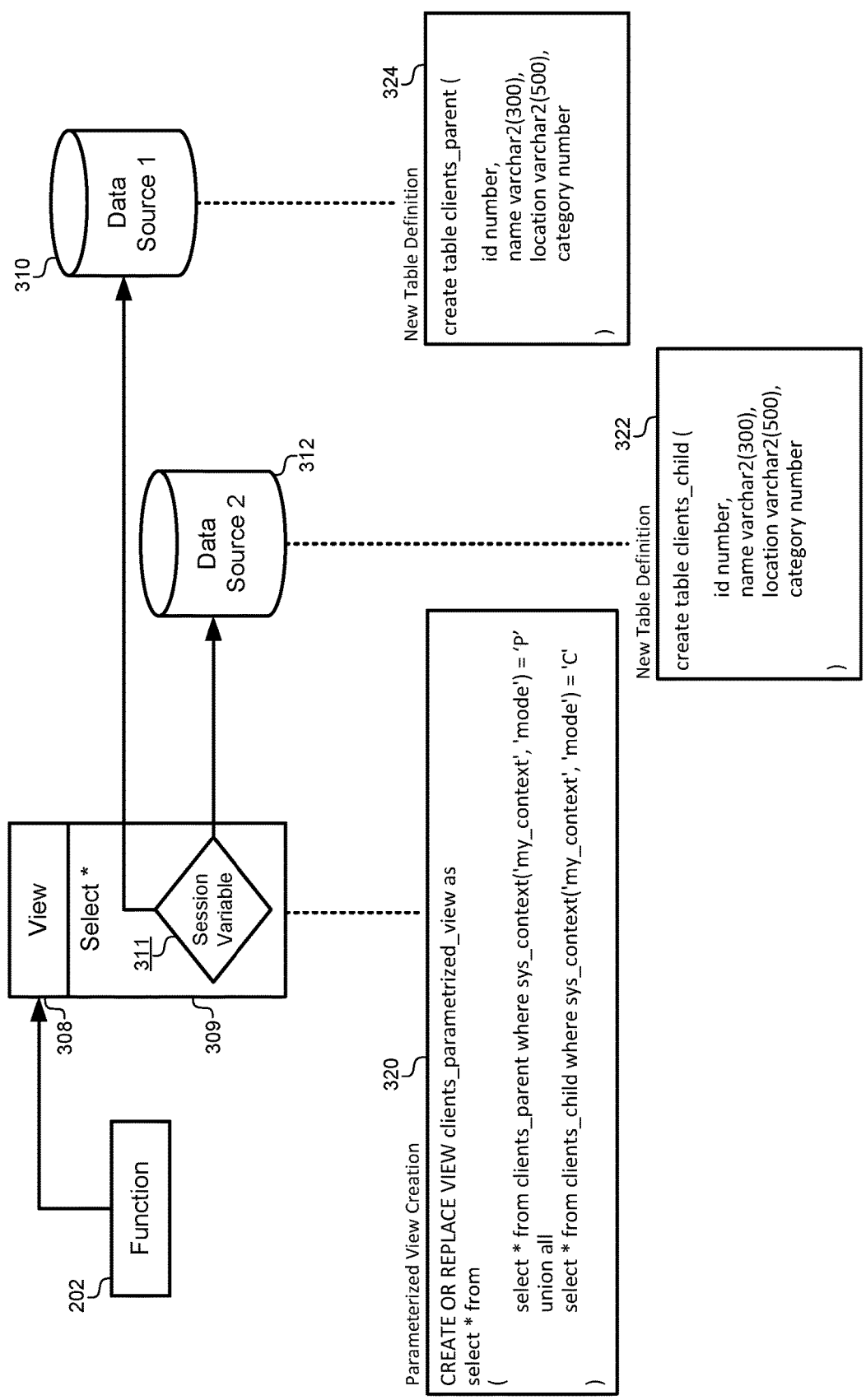
FIG. 3 illustrates a functional diagram of a parameterized view that can be created to add/replace data sources in an existing PL/SQL package, according to some embodiments.

FIG. 3 illustrates a functional diagram of a parameterized view that can be created to add/replace data sources in an existing PL/SQL package, according to some embodiments. The following code may be created using a tool that accesses and/or parses an existing PL/SQL data file. The tool may parse the existing package and list any data sources that are accessed as read-only data sources in the existing code. The tool may then allow users to input additional data sources that are added as alternatives and/or replacements for the existing data sources. The code created in FIG. 3 may then be generated automatically by the tool after the user defines replacement and/or additional data sources for each read-only data source in the existing code.

First, the tool may generate a parameterized view 320 that will replace the hard-coded reference to the original data source in the existing PL/SQL code. The parameterized view 320 may generate a new name for the data source, such as "clients_parameterized_view" as illustrated in FIG. 3. The parameterized view may use a select statement 309 that references a session variable 311 to choose between additional data sources that are added as replacement data sources by the user. In this embodiment, a first data source 310 and a secondary source 312 may be added to the design. The first data source 310 may include the original data source 204 illustrated in FIG. 2 and/or may be an entirely new data source that replaces the original data source 204 from FIG. 2. For clarity, this example replaces the original data source 204 with the new first data source 310. The tool may also generate a new first table definition 324 for the first data source 310, as well as a new second table definition 322 for the second data source 312. The parameterized view 320 may toggle between the first data source 310 and the second data source 312 using the session variable "sys_context" that will be described in detail below. In this example, the first data source 310 may be labeled the "clients_parent" table, and the second data source 312 may be labeled the "clients_child" table. These names may reference the parent-child relationship that will be described in greater detail below when writing data to these data sources.

This process may be carried out for each table that is referenced in a read-only fashion in the package. The tool may automatically generate new table definitions 322, 324 for each additional/replacement table. The tool may also automatically generate the parameterized view 320 that creates a view 308 of the additional/replacement tables. Note that the query may be more complex in order to allow for different behavior. For example, some embodiments make queries of both tables, join with different tables, query other tables, and so forth, depending on the session variable. Before calling the package functions, the session variable may be set accordingly, as described below.

FIG. 4 illustrates a context API that may be used to manipulate session variables, according to some embodiments. As described above, the additional/replacement tables added to the program may be dynamically selected at runtime using the session variable. The code in FIG. 4 in the context API allows the session variable to be set at runtime. The context API may be implemented in a PL/SQL package. A package specification 402 may provide procedures for each valid value of the session variable. In this example, two valid values for the session variable are used, although any number may be used in other embodiments. A first procedure 410 defined in the package body 404 sets the session variable to a "parent" mode that selects the "clients_parent" database table described above. A second procedure 412 defined in the package body 404 sets the session variable to a "child" mode that selects the "clients_child" database table described above. Finally, a statement 406 may be included in the program to create the session variable.

FIG. 5 illustrates changes that may be made to the existing code to allow for runtime selection of read-only data sources, according to some embodiments. In conjunction with creating the new parameterized view and the new table definitions described above, along with the context API, the tool may also replace any references to the original data source with references to the parameterized view. For example, FIG. 5 illustrates the original package specification 110 and package body 112 from FIG. 1. A change that may be made to accommodate the runtime selection of different data sources is to change the references to the original data source to instead reference the new parameterized view. For example, code 116 and code 118 in FIG. 1 have been changed such that they no longer reference the "clients" data table, and instead reference the "clients_parameterized-_view" view created above. Because the parameterized view is created at runtime according to the session variable, code 516, 518 may reference the data table selected at runtime using the session variable in the context API described above. For example, the tool may perform a search-and-replace operation to find previous references to the original data source and replace them with references to the parameterized view.

Figure 6:
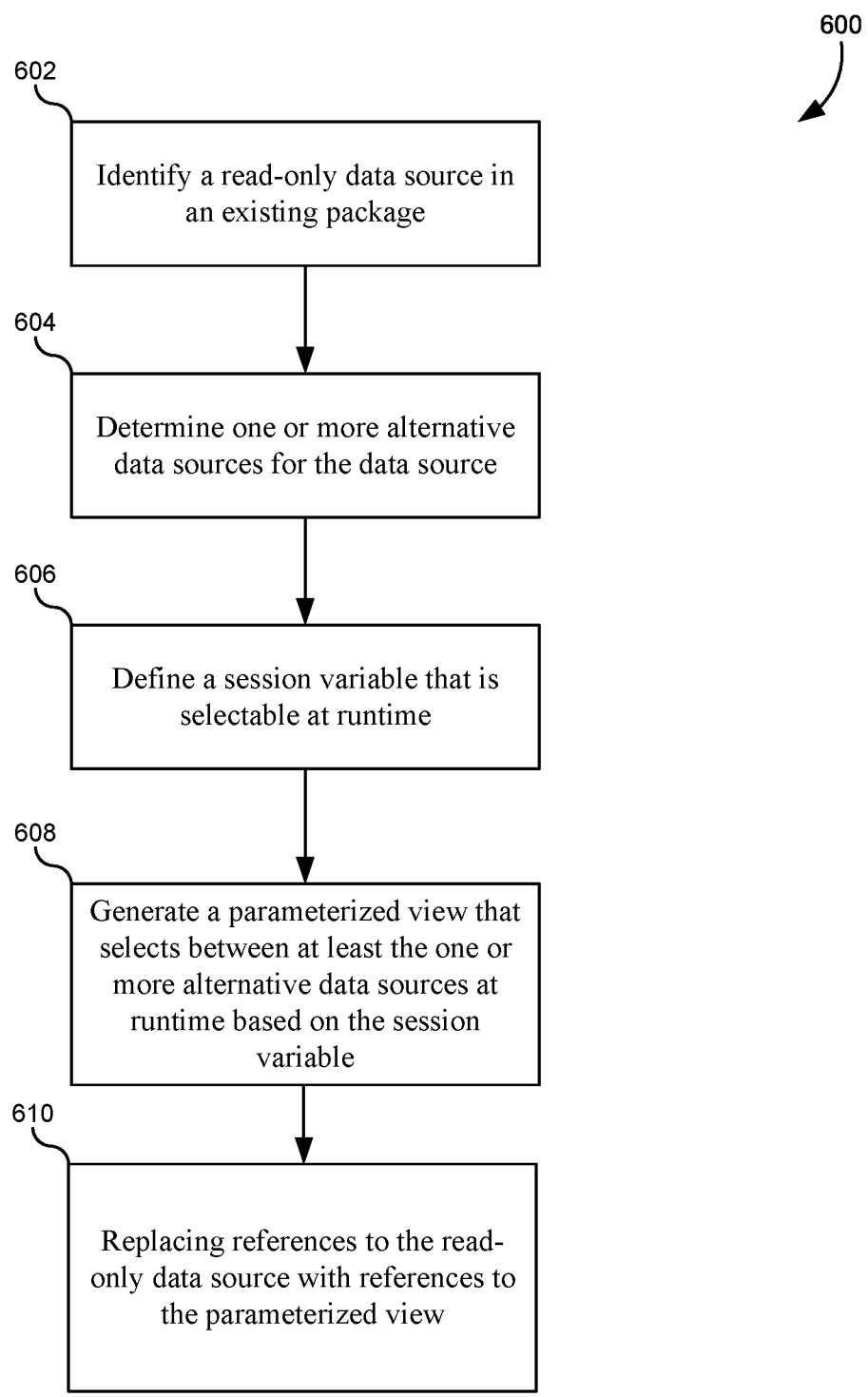
FIG. 6 illustrates a flowchart of a method for allowing runtime selection of data sources, according to some embodiments.

FIG. 6 illustrates a flowchart of a method for allowing runtime selection of data sources, according to some embodiments. The method may include identifying a read-only data source an existing package (602). The read-only data source may be identified by parsing an existing package, such as a PL/SQL package and identifying references to a data source using read-only commands, such as "select * from" as opposed to commands that manipulate data at the data source.

The method may also include determining one or more alternative data sources for the data source (604). For each identified read-only data source in the existing package, an option may be presented to identify one or more alternative data sources that may be selected instead of or in addition to the original data source. For example, two additional data sources may be received that are different from the original data source. In some embodiments, the additional data sources may replace the original data sources, while in other embodiments, the additional data sources may be added to the original data source, such that any of the original/new data sources may be selected at runtime. Code for a new table definition may be automatically generated using the name of each of the alternative data sources and specifying the column labels.

The method may additionally include defining a session variable that is selectable at runtime (606). The session variable may be set and/or reset at the beginning of or during each session during which the code will be run. A statement may be generated that creates an instance of a context object that stores the session variable and provides functions/procedures that provide the value of the session variable and/or set the value of the session variable. An example of an object that creates/sets the session variable is described above in FIG. 4.

The method may further include generating a parameterized view that selects between at least of the one or more alternative data sources at runtime based on the session variable. The parameterized view may select between any of the alternative data sources and/or the original data source based on a value of the session variable. When the view is created at runtime, the session variable can be queried, and thus the makeup of the view may be set at runtime. An example of a parameterized view that is automatically generated is described above in FIG. 3.

The method may also include replacing references to the read-only data source with references to the parameterized view (610). The method may parse the existing package to identify each read-only reference to the original data source and replace that reference with a reference to the parameterized view using the name in the definition of the parameterized view. Alternatively, the method may parse a new package and/or parent-child hierarchy of objects that is created (as described in greater detail below) and replace references to the original data source in the new package that is generated.

It should be appreciated that the specific steps illustrated in FIG. 6 provide particular methods of automatically adapting existing code to dynamically select between different data sources at runtime according to various embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

The methods described above automatically adapt existing code to select between various data sources for read-only operations at runtime. However, generating a new view as described above may not be sufficient for data manipulation operations. Views are unable to provide data manipulation (e.g., write operations) in most cases. For any data manipulation operations, the existing code may need to be altered. However, this alteration may need to be done in such a way that the system separates the data manipulation operations from the rest of the code. The embodiments described below can be used in addition to the methods described above to also allow the session variable to control data sources that are used in data manipulation operations.

Procedural language extensions for SQL do not provide inheritance capabilities for packages, although recent versions of these languages may include inheritance capabilities for objects types. The embodiments described herein simulate parent and child packages by generating a new package that references new object types. For a given package, a portion of the code is copied into an object type, then a new child object type can be created to override any logic and/or data manipulation operations in the parent object.

Figure 7:
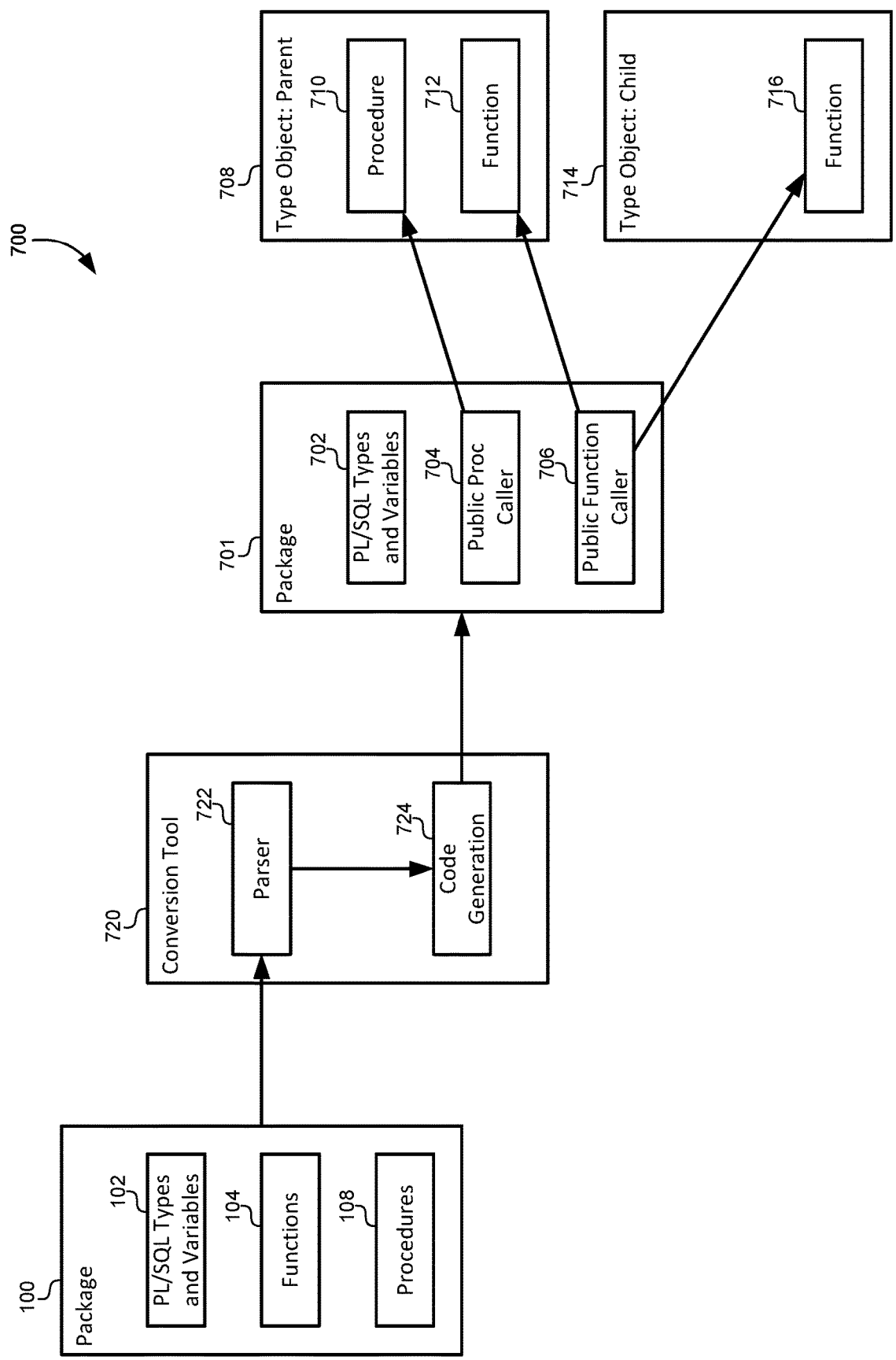
FIG. 7 illustrates a block diagram of a process flow for a conversion tool that converts existing packages into packages that dynamically switch between data sources, according to some embodiments.

FIG. 7 illustrates a block diagram of a process flow 700 for a conversion tool 720 that converts existing packages into packages that dynamically switch between data sources, according to some embodiments. As described above, an original package 100 may include a packet specification that includes declarations of types and variables 102. The original package 100 may also include a package body that includes definitions of functions 104 and/or procedures 108. This original package may be provided as an input to a conversion tool 720. The conversion tool 720 may include a parser 722 that parses the text of the package 100. In some embodiments, the parser 722 may be part of an interpreter and/or compiler that runs the package code 100. The parser 722 may encode the text of the package 100 to identify programming constructs such as variable declarations, function declarations, function definitions, and so forth.

After parsing the package 100, the parser 722 can pass the encoded programming constructs to a code generation process 724. The code generation process 724 may analyze the contents of the package 100 and generate new code files using an algorithm described in detail below. At a high level, the code generation process 722 may generate a new package 701. The new package 701 may include declarations of types and/or variables that are specific to the PL/SQL language 702. The new package 701 may also include function definitions 706 and procedure definitions 704 that have signatures that match those of the original package 100. This allows the new package 701 to be used directly in place of the original package 100 without breaking any dependencies with packages or objects that call the functions 104 and/or procedures 108 of the original package 100.

The code generation process 724 may also generate one or more object types that encapsulate the code from the original function definitions 104 and/or procedure definitions 108. For example, the code from the original procedure definitions 108 may be copied into procedure definitions 710 in a first object 708. Similarly, the code from a function definition 104 may be copied into a new function definitions 712 in the first object 708. The function 706 and procedure 704 in the new package 701 may call the member functions of the first object 708 to execute the original functionality of the functions/procedures. As described below, additional member procedures may be defined in the first object 708 such that the data access/manipulation code may be separated from the process code.

In order to allow switching between various data sources for data manipulation operations, one or more additional object types may also be defined by the code generation process 724. In this example, a second object type 714 is defined as a child object of the first object 708. The second object 714 may include functions that override the member procedures defined in the first object 708. The member procedures in the child object 714 may override the data manipulation code in the member procedures of the parent object 708 such that different data sources may be used. This allows the code to dynamically select a data source at runtime using the session variable described above to instantiate a parent object 708 or a child object 714 depending on the desired data source.

Figure 8:
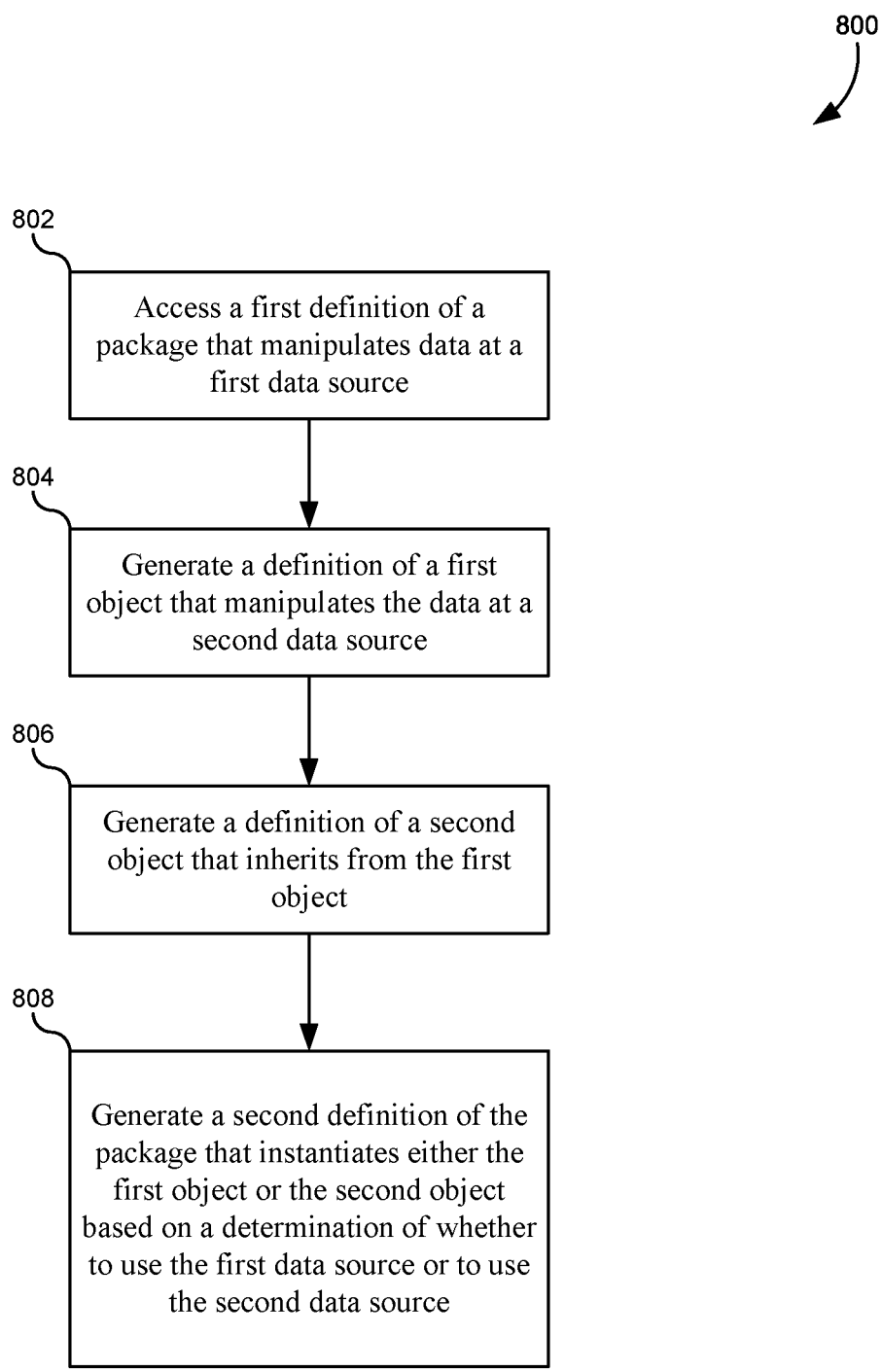
FIG. 8 illustrates a flowchart of a method for analyzing an existing package and generating a new package that dynamically switches between data sources at runtime, according to some embodiments.

FIG. 8 illustrates a flowchart 800 of a method for analyzing an existing package and generating a new package that dynamically switches between data sources at runtime, according to some embodiments. Each of the steps in the method described below may include one or more additional, optional sub-steps depending on the nature of the procedures, functions, and/or datatypes in the existing package code. Therefore, as each step is described below, this disclosure will provide additional examples, optional sub-steps, and code diagrams to illustrate how each step in flowchart 800 may be carried out according to various embodiments. It should be emphasized that none of the sub-steps are considered essential, and any of these sub-steps may be omitted in various embodiments.

Additionally, the following methods and/or examples use PL/SQL as an example language to illustrate how these steps may be executed. However, the principles described below may be used by one having skill in the art in light of this disclosure to apply these principles to other programming languages. Therefore, although PL/SQL is used as an example, these principles may also be applied to any procedural language extension to any query language.

The method may include accessing a first definition of a package that manipulates data at a first data source (802). For example, an existing package may include datatypes, variable declarations, function declarations/definitions, procedure declarations/definitions, and so forth. Accessing the first definition of a package may include loading a text file containing the package code. This may also include parsing the text of the file containing the package definition to identify datatypes, variables, functions, procedures, programming constructs, and so forth. This parsing may leverage an existing interpreter/compiler and/or may use a dedicated text parser to identify the programming constructs described below. As part of accessing the first definition of the package, some embodiments may also provide one or more additional data sources that may be used with or in the place of the first data source. These may be provided by a user through a user interface.

The method may also include generating a definition of a first object that manipulates the data at a second data source (804). Previously, the first definition of the package may have included functions and/or procedures that manipulated data at the first data source. In this step, code for a new object type may be generated that includes similar functions and/or procedures. The functions and/or procedures in the first object definitions may initially include copies of the code from the functions and/or procedures in the first definition of the package such that the functions and/or procedures of the first object interact with data sources rather than the package itself.

Figure 9:
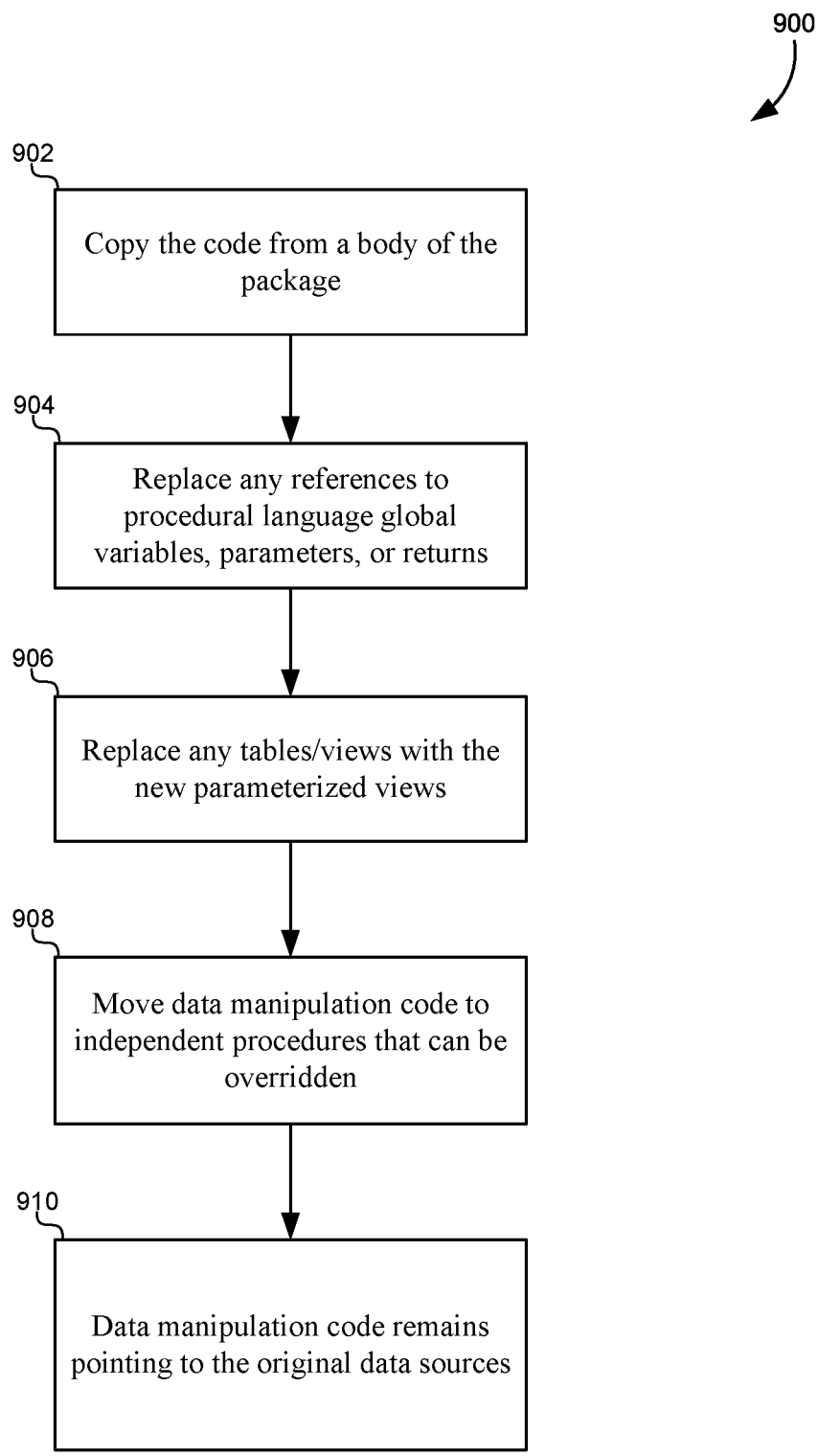
FIG. 9 illustrates a flowchart of various optional sub-steps that may be executed as part of step from flowchart, according to some embodiments.

FIG. 9 illustrates a flowchart 900 of various optional sub-steps that may be executed as part of step 804 from flowchart 800, according to some embodiments. These steps and be executed as an algorithm for generating the code for the first object type. The method may include copying code from the package body into a new object body (902). For example, definitions for functions and/or procedures in the original package definition may be copied directly into corresponding functions and/or procedures in the new object type definition. Any references to procedural language global variables, parameters, and/or returns may be replaced with variables, parameters, and/or returns that are compatible with the query language (904). Recall that the objects may be specific to the query language and may not support the procedural language extension datatypes. As described above, any tables or views may be replaced with the new parameterized views (906). Next, any data manipulation code in the functions and/or procedures may be extracted and moved into independent functions and/or procedures that can be overridden by child objects (908). This may be done to separate the data access code from the data processing code as described above. This may also be done such that the data manipulation code can be overridden in child objects such that different data sources can be used and selected at runtime. The data manipulation code that is moved to the independent functions and/or procedures may remain pointing to the original data sources, such that the new object type continues to manipulate data at a specific data source, such as the first, original data source, and still allows child objects to override this code and manipulate data at other data sources. FIGS. 10-13 illustrate code examples of how these various sub-steps may be executed.

FIG. 10 illustrates an original package specification 110 and a new object type specification 1002, according to some embodiments. The original package specification 110 may be part of the first package definition described above. The original package specification 110 may include a data type definition 114 for the "num_table_type" data type, a declaration 117 for an "insert_client" procedure, and a declaration 115 for a "find_client" function. When accessing/parsing the original package specification 110, the parser described above may identify the datatype and the procedure/function declarations.

When generating the object type specification 102 of the first object (e.g., the parent object), the declarations 114, 115, 117 may be copied directly from the original package specification 110. However, the "num_table_type" may be removed from the object type specification 1002 because it is only supported by the procedural language extension and not by the query language itself. Because this datatype is not supported by the query language itself, the "p_top_client_ids" parameter has also been removed from the corresponding member procedure "insert_client." Other than removing this parameter, the definitions for the member procedures and/or member functions 1004 may be identical to the corresponding declarations in the original package specification 110.

Two new member procedures declarations 1006 have been generated to handle the data manipulation language code. As described below, each time a data manipulation operation takes place in the original code of the original package, that code can be extracted and ported into a new dedicated member procedure. In this example, the "insert_client" procedure includes two instances of data manipulation at the first data source. Each of these instances of data manipulation have been extracted and written into new member procedures "insert_client_dml_1" and "insert_client_dml_2." A description of these procedure definitions is included below.

FIG. 11 illustrates a portion of the first (e.g., parent) object body 1102 that includes a definition for the member functions of the object, according to some embodiments. Recall that the original package 110 included one member function, "find_client," that received a name and a location and returned a numeric location of the client in the data source. Because this is a read-only function, the code can be copied entirely from the original function from the original package 110 into a new member function of the object in the object body 1102. As described above, each of the references to the original data source (e.g., the "clients" table) may be replaced with a reference to a parameterized view (e.g., the "clients_parameterized_view" view). This parameterized view can dynamically select between data sources from which to read based on the session variable as described above.

FIG. 12A illustrates an excerpt of code from the original package body 1250 that includes a procedure for inserting new data into the data source, according to some embodiments. Initially, this code may be copied in its entirety over to a new member procedure in the object body. Portions of the code of the original package body 1250 have been highlighted that may be altered by the algorithm described above. For example, this package procedure includes references 1224, 1226 to the original "clients" table. This package procedure also includes data manipulation code 1228, 1230 that updates values in the "clients" data table. These are the sections that can be moved to new member procedures in the object to separate the data manipulation code from the data processing code. Additionally, this package procedure references the "p_top_client_ids" parameter that uses a type that is not supported by the query language and has been removed in the new object procedure.

FIG. 12B illustrates code generated for the member procedure in the object body 1102 for inserting data into the data source, according to some embodiments. Using the algorithm described above in FIG. 9, the references to the "clients" table have been replaced with references 1204, 1206 to the "clients_parameterized_view" view to allow these read-only operations to dynamically switch between data sources at runtime based on the session variable. Additionally, the data manipulation code that writes data to the data source has been replaced with calls to new member procedures that will be generated and added to the object body. Each instance of a new member procedures copies data manipulation code from the original procedure into the definition of the new member procedures. The procedures may be declared using parameters corresponding to each of the arguments for the data manipulation code that is copied into the procedures. In this example, the data manipulation code has been replaced with the "insert_client_dml_1" and "insert_client_dml_2" procedures that will be defined below. Finally, the references to the "p_top_client_ids" parameter have been replaced with references to a new global variable that will be defined in the new package. This new global variable uses a PL/SQL datatype that is removed as a parameter because PL/SQL data types are not allowed in type specifications in the query language as parameters or returns. However, they can be used inside of the type bodies directly in the new package, and thus can be referenced by this procedure.

FIG. 13 illustrates an example of new member procedures that may be automatically generated to handle the data manipulation operations, according to some embodiments. As described above, the new "insert_client_dml_1" and "insert_client_dml_2" procedures copy the data manipulation code from the original procedure to separate this code from the data processing code in the original procedure. Function signatures are generated such that a parameter list includes each of the variables used in the data manipulation operations. For example, when parsing the data manipulation operations, the parser can generate a list of variables used by the operations, and the code generation process may generate process signatures and definitions that list these variables as parameters.

In addition to separating the data manipulation code from the data processing code, these new member procedures also directly reference one of the new data sources. Instead of replacing a reference to the "clients" table with a reference to the "clients_parameterized_view" view, the code in these member procedures directly references the "clients_parent" table. For read-only operations, the parameterized view can dynamically switch between the "clients_parent" table and the "clients_child" table using the session variable as described above. However, for data manipulation operations, these new data tables are referenced directly in the new data manipulation member procedures. In order to switch between data sources, additional child objects may be defined with corresponding member procedures that overwrite the code in these member procedures to reference different data sources. These child objects and instantiating parent/child objects using the session variable are described in greater detail below.

Turning back briefly to FIG. 8, the overall method for analyzing an existing package and generating a new package that dynamically switches between data sources at runtime may now continue. Note that the second data source may be the same as the first data source if the original data source is to still be available in the new version of the code. Alternatively, the second data source may be an entirely different data source, such as a different database table. The method may also include generating a definition of a second object that inherits from the first object (806). The definition of the second object may override portions of the definition of the first object that manipulate the data at the second data source to instead manipulate data at a third data source. This may allow different objects to reference different data sources for data manipulation operations. This also continues to separate the data manipulation code from the data processing code for the reasons described above. An example of generating a child object is illustrated below in FIGS. 14-15.

Figure 14:
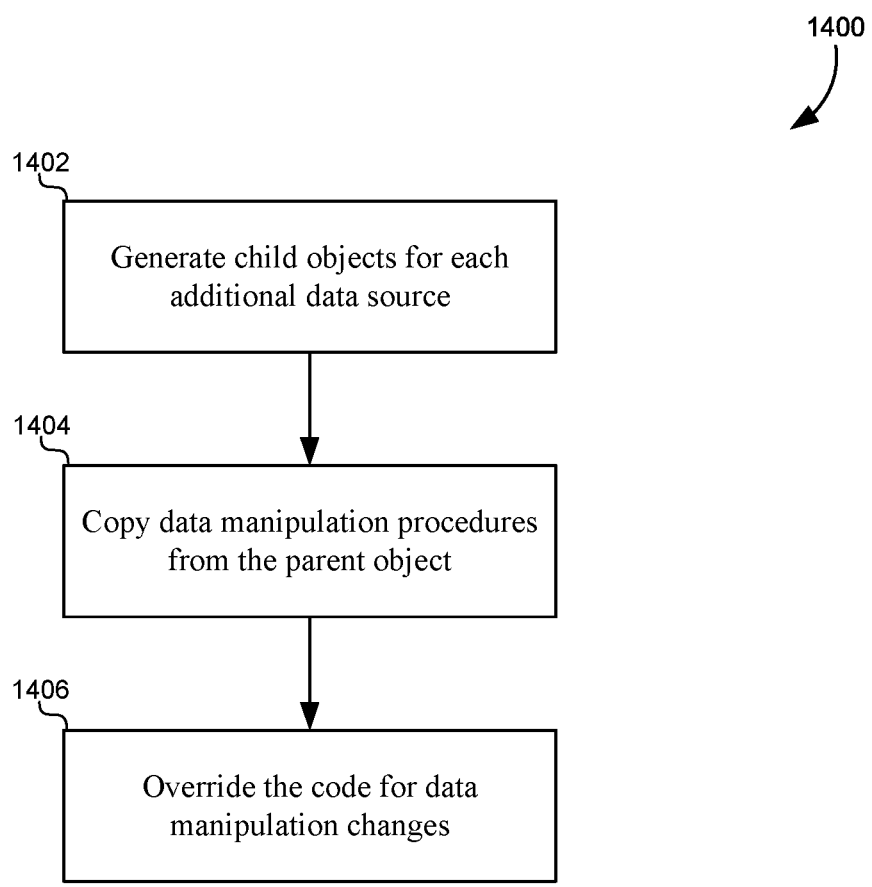
FIG. 14 illustrates a flowchart of various optional substeps that may be executed to generate code for the second object, according to some embodiments.

FIG. 14 illustrates a flowchart of various optional sub-steps that may be executed to generate code for the second object, according to some embodiments. The method may include generating child objects for each additional data source (1402). Each of the child objects may be a descendent of the original parent object described above such that each of the child objects inherit the functionality of the parent object. Recall that these object may be generated because packages in PL/SQL cannot inherit from each other. Therefore, to be able to use dynamic inheritance as a method for changing functionality at runtime, the code from the original package may be ported into a parent-child hierarchy of objects. The child objects can be simpler than the original parent object, as they inherit all of the functionality of the parent object.

The method may additionally include copying data manipulation procedures from the parent object (1404). The new data manipulation procedures that were added to the parent object may be copied into the specification/body of the child object. The method may further include overriding the code for the data manipulation changes in the data manipulation procedures (1406). Any functionality that changes the way in which data is manipulated may be encapsulated in the overriding code of these data manipulation procedures in each child object. For example, when switching between data sources, a new child object type may be defined for each data source. The overriding data manipulation procedures in each child object may specifically reference a different data source. This allows the new package to choose between various parent/child objects to instantiate at runtime based on the session variable, and consequently to choose between different data sources at runtime.

FIG. 15 illustrates code that may be automatically generated for various child object types, according to some embodiments. The child object specification 1502 includes a simple constructor and declarations of the two data manipulation member procedures that were newly created in the parent object type. These member procedures may be labeled as OVERRIDING such that their functionality overrides the corresponding member procedures in the parent object when the child objects are instantiated.

The child object body 1504 includes a definition of the simple constructor as well as definitions for the member functions with the overriding code. For example, each of the data manipulation member procedures may change the data source from the "clients_parent" table in the parent object to instead use the "clients_child" table. The rest of the code may be maintained as in the parent object.

Note that these figures switch between different data sources for insert/update operations using a data table. However, these examples are provided merely by way of example and are not meant to be limiting. Other embodiments may change any functionality at runtime using the parent/child object code generation algorithms described above. The data manipulation member procedures that are added to these objects can include any type of data manipulation code that is to be separated from the data processing code. These operations may go beyond switching between different databases and may instead perform different operations on the same database, perform different operations on different databases, and/or any other type of data manipulation operation.

Turning back again briefly to FIG. 8, the overall method for analyzing an existing package and generating a new package that dynamically switches between data sources at runtime may continue by generating a new package specification and body. Thus, the method may further include generating a second definition of the package that instantiates either the first object or the second object based on a determination of whether to use the second data source or to use the third data source (808). The second definition of the package may include generating an entirely new file with code defining the package. Alternatively, the second package definition may involve editing the existing package definition according to the algorithm described below. The new package definition may be referred to as a second definition of the same package because the outside interface of the package may remain the same such that any compatibility with the previous package definition will not be broken.

Figure 16:
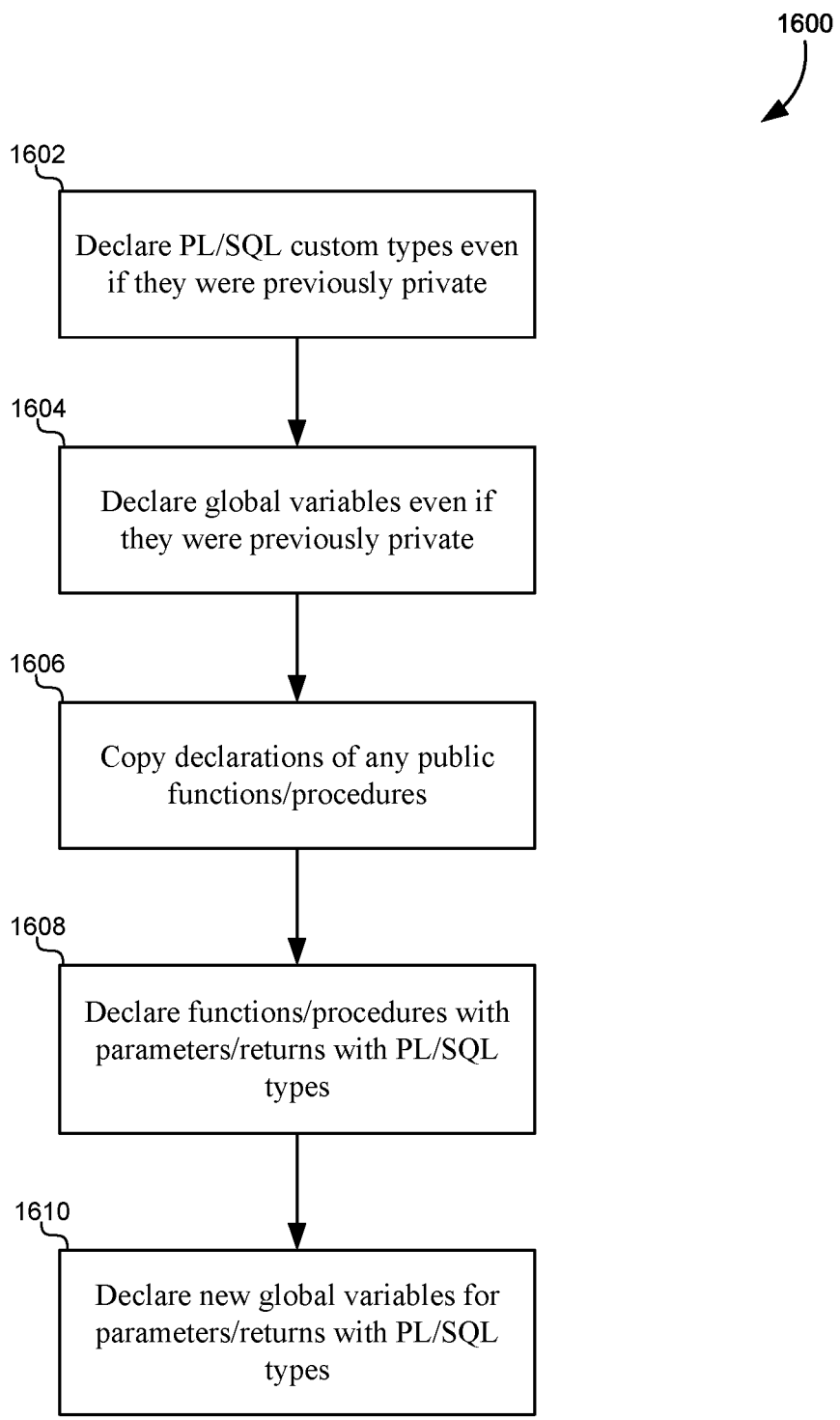
FIG. 16 illustrates a flowchart comprising optional substeps for generating a new package specification, according to some embodiments.

FIG. 16 illustrates a flowchart 1600 comprising optional sub-steps for generating a new package specification, according to some embodiments. The new package specification, or header, may maintain the public interface of the previous package while declaring new variables/types to be compatible with the new objects described above. The method may include declaring PL/SQL custom types even if they were previously private (1602). These custom types may be made publicly available such that the objects can utilize these type definitions. The method may also include declaring global variables even if they were previously private (1604). Copies of the declarations of any public functions and/or procedures may be copied into the new specification (1606). These may be copied without changes to maintain compatibility.

As described above, the functionality of these functions and/or procedures may be moved from the package body to the functions in the parent/child objects. To ensure compatibility with the new object functions/procedures, any previously private functions/procedures with parameters/returns using PL/SQL types may be publicly declared in the new package specification (1608). Since these parameters/returns cannot be passed using these datatypes to the function/procedures in the new parent/child objects, the method may also include declaring new global variables for each parameter/return using the PL/SQL types (1610).

FIG. 17 illustrates an example of a new package specification 1702 generated for compatibility with the new parent/child objects, according to some embodiments. In the new package specification 1702, the previous "num_table_type" datatype is still publicly declared as a datatype. Next, a new global variable "g_p_top_client" is declared using that datatype. The "insert_client" procedure and the "find_client" function declarations are copied from the previous package specification. However, the datatypes for the parameters reference the datatype specifically used in the "clients" database. Note that the "p_top_client_ids" parameter is still included in the "insert_client" procedure, even though this PL/SQL datatype is not natively supported by the SQL objects. Note that even when the original code references the type clients.name % TYPE, the parsing program can check for this type in the database and use that type from the database instead in the object types declaration, as "clients.name % TYPE" is not a valid parameter type in object types, but varchar2 is valid as it is a SQL type.

Figure 18:
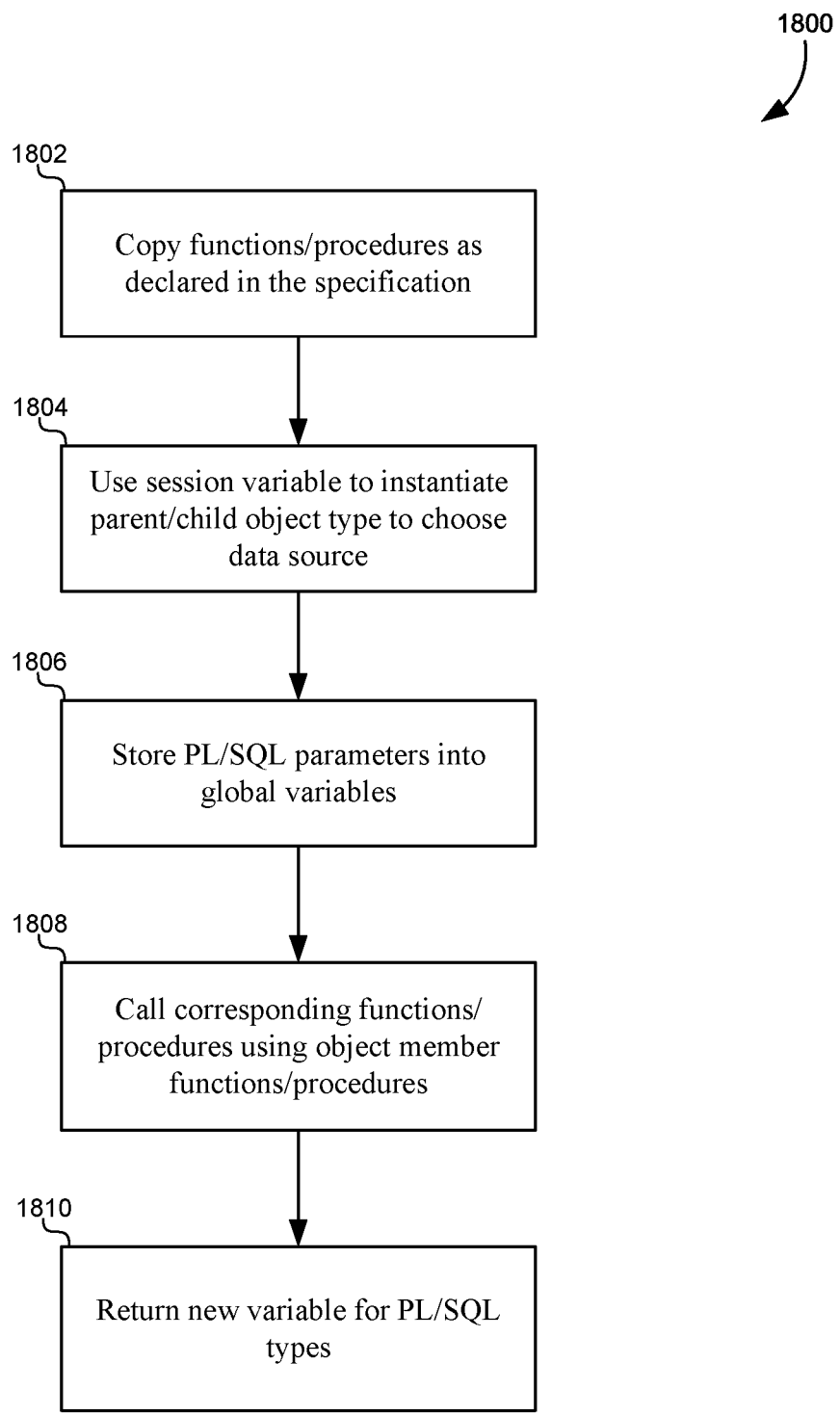
FIG. 18 illustrates a flowchart comprising optional substeps for generating the new package body, according to some embodiments.

FIG. 18 illustrates a flowchart 1800 comprising optional sub-steps for generating the new package body, according to some embodiments. The method may include copying any functions/procedures as declared in the package specification (1802). In addition to the function/procedure definitions, the method may use a session variable to instantiate a parent or child object type. The type of object instantiated may then determine the data source selected for this runtime session. For example, choosing the child object type in the example above would use the "clients_child" table data for manipulation operations. This allows the session variable to govern the data sources used for each runtime session.

The new package specification may translate the public function/procedure calls made to the package into private calls that are made to the functions/procedures in the parent/child objects. Any PL/SQL parameters may be stored into the global variables declared in the new package specification described above (1806). Instead of passing these values as parameters, they are instead stored in the global variables and then referenced as global variables in the function/procedures in the new objects. Instead of the package specification including the code for executing the functions/procedures, the new function/procedure definitions in the new package body may instead call corresponding functions/procedures using the object member functions/procedures (1808). When a function returns a PL/SQL type, instead of using a return statement, the function is converted to a procedure (which is a function without return value) in the object. Then, where the original code would call "return result," the new object code will instead assign that result to a public variable in the new package, and exit the procedure, similar to how a return call exists a function. Once assigned, the function in the new package returns the public variable using a return statement (1810).

FIG. 19 illustrates an example of a package body 1902 that is automatically generated to instantiate and call object member functions according to a session variable, according to some embodiments. The new package body includes code 1910 that instantiates a new package object based on the session variable described above. If the session variable is set to have an object mode of "P" (e.g., parent mode), then a parent object will be created. In this example, the parent object references the "clients_parent" data table for data manipulation operations in the member functions and similarly creates a view of the "clients_parent" data table in the parameterized view for read-only operations.

Additionally, procedure definitions 1912 and function definitions 1914 may create objects of the type specified by the session variable. The functions may then store any parameter values passed to the package function/procedure into the global variables described above such that they can be referenced by the object member functions. Then the procedure definitions 1912 and function definitions 1914 may use the object to call the corresponding member function using the remaining SQL-compatible parameters.

It should be appreciated that the specific steps illustrated in FIG. 8—along with the other flowcharts described herein—provide particular methods of analyzing an existing package and generating a new package that dynamically switches between data sources at runtime according to various embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 20:
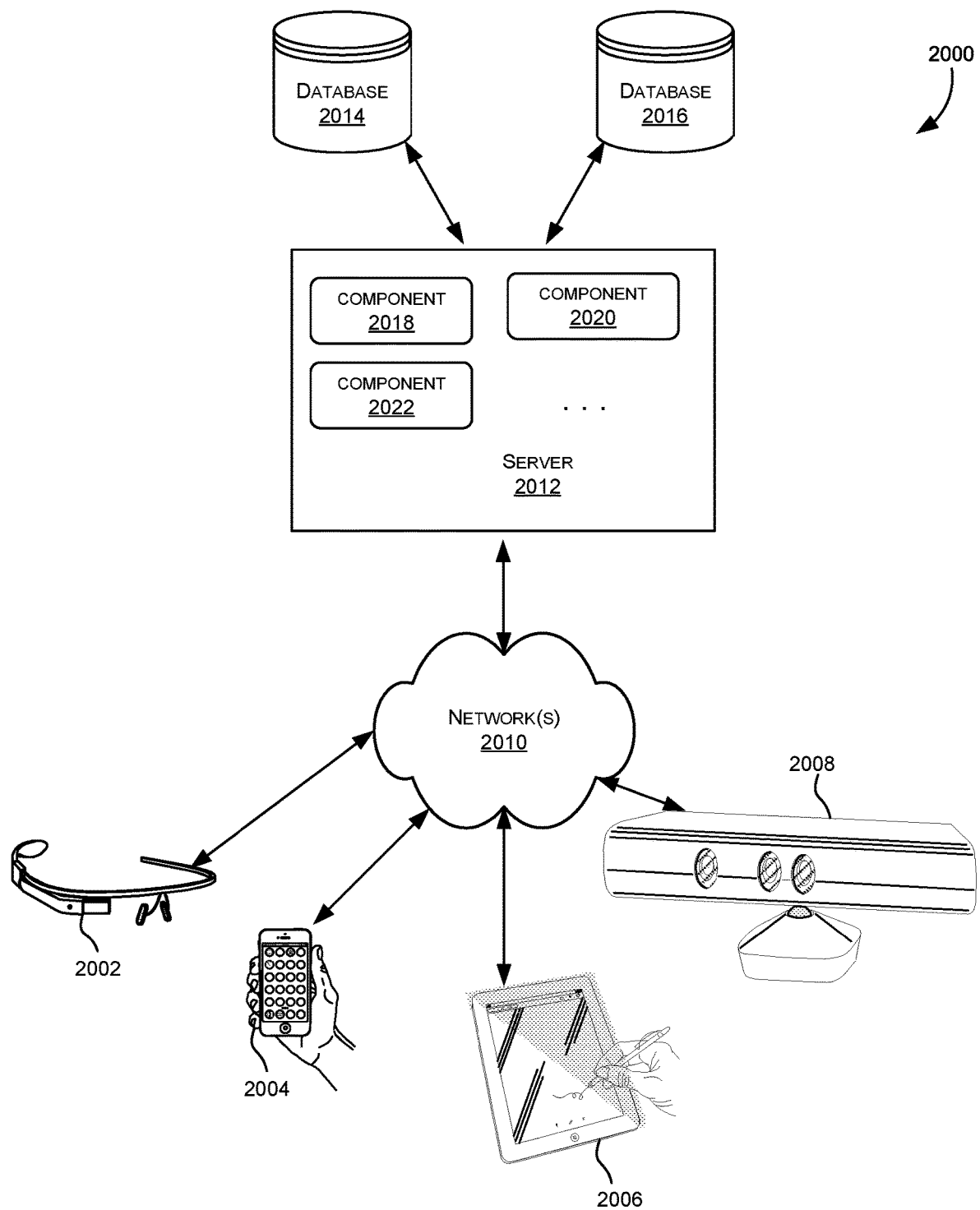
FIG. 20 illustrates a simplified block diagram of a distributed system for implementing some of the embodiments.

FIG. 20 depicts a simplified diagram of a distributed system 2000 for implementing one of the embodiments. In the illustrated embodiment, distributed system 2000 includes one or more client computing devices 2002, 2004, 2006, and 2008, which are configured to execute and operate a client application such as a web browser, proprietary client (e.g., Oracle Forms), or the like over one or more network(s) 2010. Server 2012 may be communicatively coupled with remote client computing devices 2002, 2004, 2006, and 2008 via network 2010.

In various embodiments, server 2012 may be adapted to run one or more services or software applications provided by one or more of the components of the system. In some embodiments, these services may be offered as web-based or cloud services or under a Software as a Service (SaaS) model to the users of client computing devices 2002, 2004, 2006, and/or 2008. Users operating client computing devices 2002, 2004, 2006, and/or 2008 may in turn utilize one or more client applications to interact with server 2012 to utilize the services provided by these components.

In the configuration depicted in the figure, the software components 2018, 2020 and 2022 of system 2000 are shown as being implemented on server 2012. In other embodiments, one or more of the components of system 2000 and/or the services provided by these components may also be implemented by one or more of the client computing devices 2002, 2004, 2006, and/or 2008. Users operating the client computing devices may then utilize one or more client applications to use the services provided by these components. These components may be implemented in hardware, firmware, software, or combinations thereof. It should be appreciated that various different system configurations are possible, which may be different from distributed system 2000. The embodiment shown in the figure is thus one example of a distributed system for implementing an embodiment system and is not intended to be limiting.

Client computing devices 2002, 2004, 2006, and/or 2008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2002, 2004, 2006, and 2008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2010.

Although exemplary distributed system 2000 is shown with four client computing devices, any number of client computing devices may be supported. Other devices, such as devices with sensors, etc., may interact with server 2012.

Network(s) 2010 in distributed system 2000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2010 can be a local area network (LAN), such as one based on Ethernet, Token-Ring and/or the like. Network(s) 2010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2012 may be adapted to run one or more services or software applications described in the foregoing disclosure. For example, server 2012 may correspond to a server for performing processing described above according to an embodiment of the present disclosure.

Server 2012 may run an operating system including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2012 may include one or more applications to analyze and consolidate data feeds and/or event updates received from users of client computing devices 2002, 2004, 2006, and 2008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2012 may also include one or more applications to display the data feeds and/or real-time events via one or more display devices of client computing devices 2002, 2004, 2006, and 2008.

Distributed system 2000 may also include one or more databases 2014 and 2016. Databases 2014 and 2016 may reside in a variety of locations. By way of example, one or more of databases 2014 and 2016 may reside on a non-transitory storage medium local to (and/or resident in) server 2012. Alternatively, databases 2014 and 2016 may be remote from server 2012 and in communication with server 2012 via a network-based or dedicated connection. In one set of embodiments, databases 2014 and 2016 may reside in a storage-area network (SAN). Similarly, any necessary files for performing the functions attributed to server 2012 may be stored locally on server 2012 and/or remotely, as appropriate. In one set of embodiments, databases 2014 and 2016 may include relational databases, such as databases provided by Oracle, that are adapted to store, update, and retrieve data in response to SQL-formatted commands.

Figure 21:
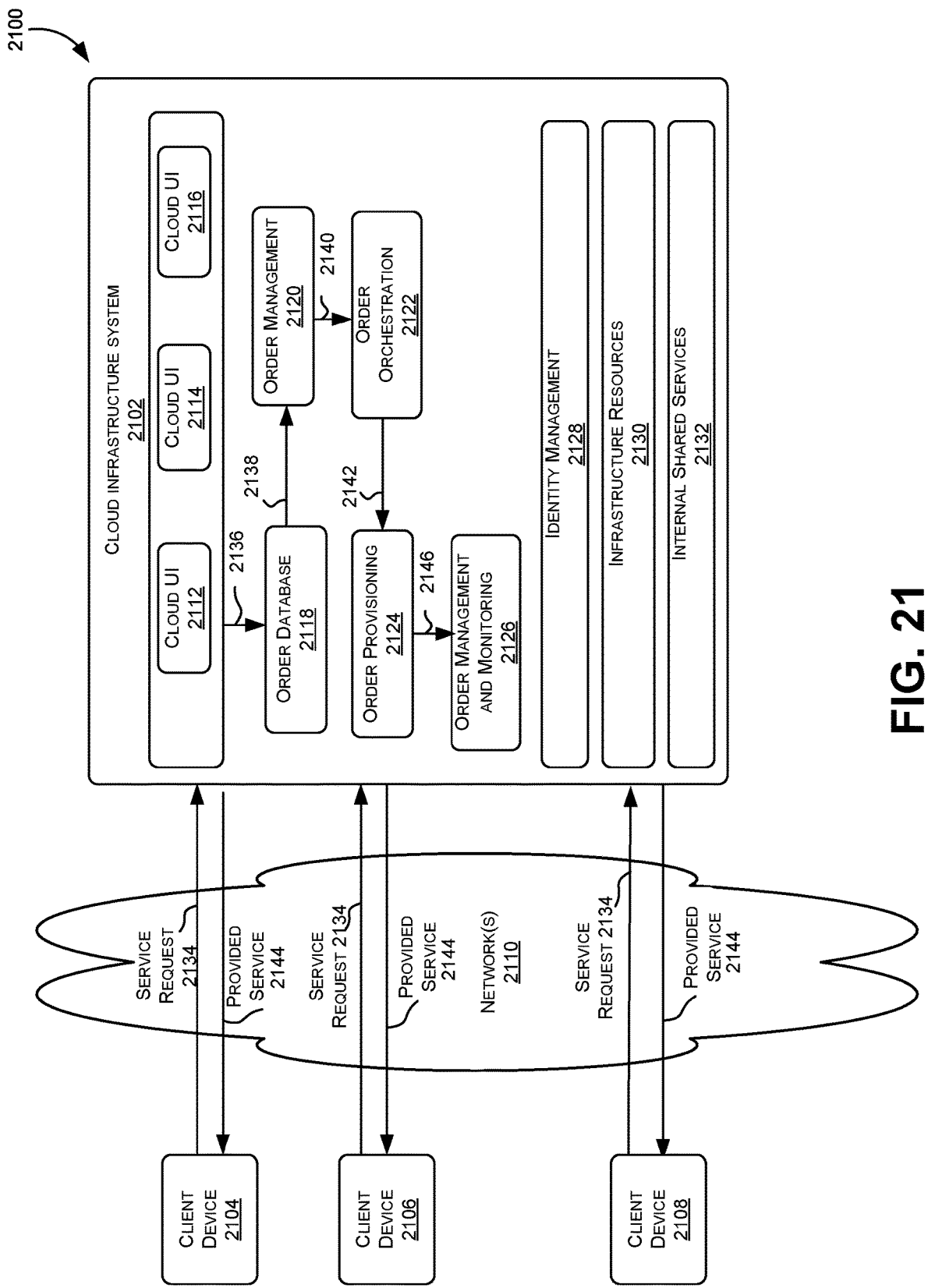
FIG. 21 illustrates a simplified block diagram of components of a system environment by which services provided by the components of an embodiment system may be offered as cloud services.

FIG. 21 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application (e.g., Oracle Forms), or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for 2002, 2004, 2006, and 2008.

Although exemplary system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially-available protocols, including those described above for network(s) 2010.

Cloud infrastructure system 2102 may comprise one or more computers and/or servers that may include those described above for server 2012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services (e.g., owned by Oracle) and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In exemplary operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116.

At operation 2136, the order is stored in order database 2118. Order database 2118 can be one of several databases operated by cloud infrastructure system 2118 and operated in conjunction with other system elements.

At operation 2138, the order information is forwarded to an order management module 2120. In some instances, order management module 2120 may be configured to perform billing and accounting functions related to the order, such as verifying the order, and upon verification, booking the order.

At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2100 and the physical implementation layer that is used to provision the resources for providing the requested services. Order orchestration module 2122 may thus be isolated from implementation details, such as whether or not services and resources are actually provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2100 may include an identity management module 2128. Identity management module 2128 may be configured to provide identity services, such as access management and authorization services in cloud infrastructure system 2100. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

Figure 22:
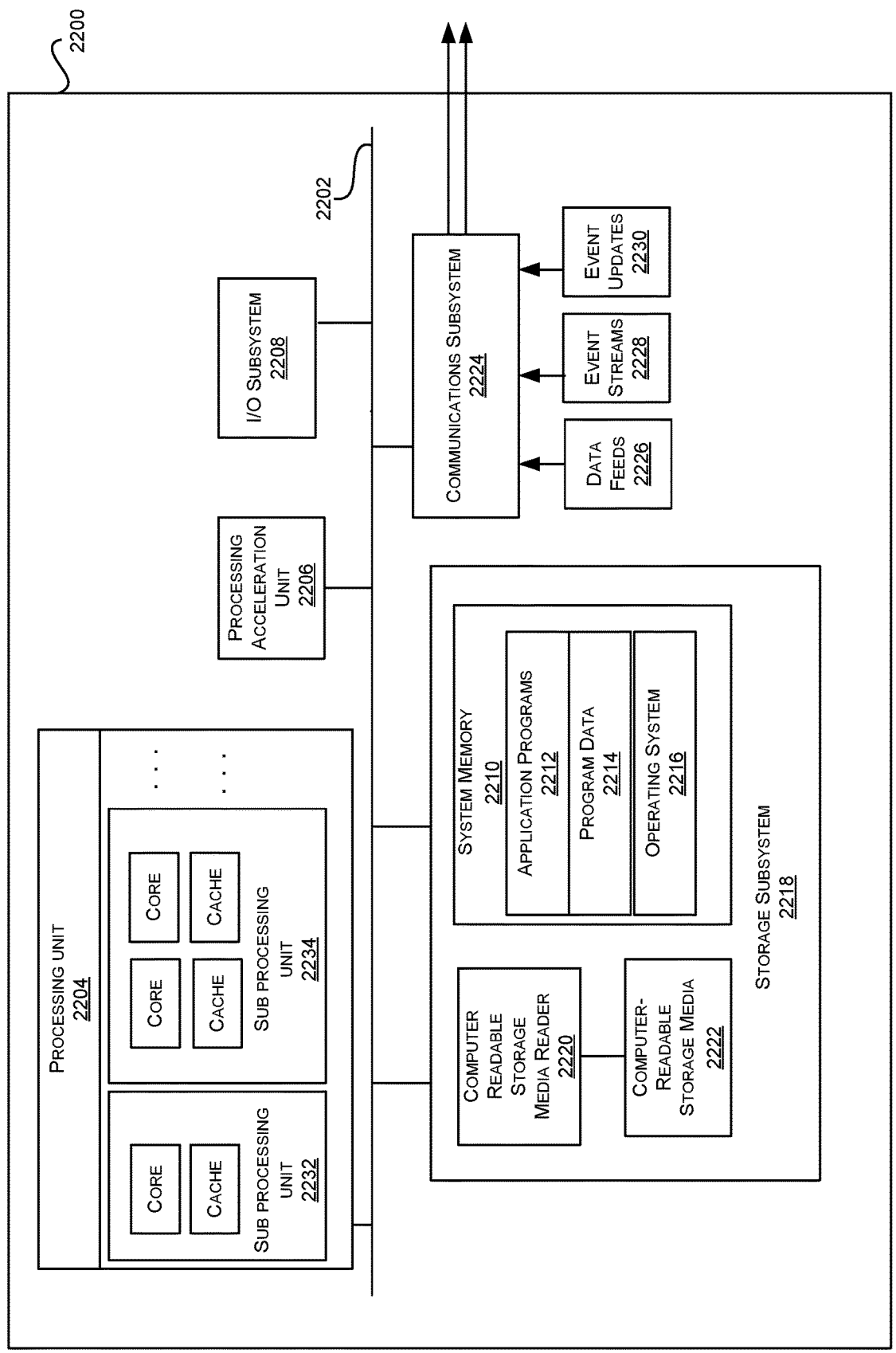
FIG. 22 illustrates an exemplary computer system, in which various embodiments may be implemented.

FIG. 22 illustrates an exemplary computer system 2200, in which various embodiments of the present invention may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present invention.

Storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   accessing a first definition of a package that manipulates data at a first data source using a procedural language extension of a query language;
   generating a definition of a first object that manipulates data at a second data source;
   generating a definition of a second object that inherits from the first object, wherein the definition of the second object overrides a portion of the definition of the first object that manipulates the data at the second data source to instead manipulate data at a third data source;
   accessing a session variable that is settable at runtime and indicates whether to use the second data source or to use the third data source; and
   generating a second definition of the package that instantiates either the first object or the second object based on whether the session variable indicates using the second data source or to use the third data source.

2. The non-transitory computer-readable medium of claim 1, wherein:
   the first definition of the package reads from the first data source; and
   the operations further comprise generating a view that selects from either the first data source or the second data source based on the whether the session variable indicates using the first data source or to use the second data source.

3. The non-transitory computer-readable medium of claim 2, wherein the operations further comprise:
   causing the first definition of the package or the definition of the second object to read from the view instead of from the first data source.

4. The non-transitory computer-readable medium of claim 1, wherein:
   the first definition of the package comprises a first function definition; and
   generating the definition of the first object comprises:
      generating a second function definition in the definition of the first object that matches the first function definition; and
      copying code from the first function definition in the first definition of the package into the second function definition in the definition of the first object.

5. The non-transitory computer-readable medium of claim 4, wherein the operations further comprise:
   changing the code copied from the first function definition such that the second function definition manipulates the data at the second data source instead of the first data source.

6. The non-transitory computer-readable medium of claim 4, wherein:
   the first function definition comprises a parameter having a type that is not supported by the query language; and
   removing the parameter from the second function definition in the first object.

7. The non-transitory computer-readable medium of claim 6, wherein the operations further comprise:
   generating a global variable for the parameter in the second definition of the package, wherein the second function definition in the first object references the global variable instead of the parameter.

8. The non-transitory computer-readable medium of claim 4, wherein the operations further comprise:
   identifying data manipulation code in the second function definition in the first object that manipulates the data at the second data source;
   generating a third function definition in the first object;
   removing the data manipulation code from the second function definition and replacing the data manipulation code with a call to the third function definition; and
   placing the data manipulation code in the third function definition.

9. The non-transitory computer-readable medium of claim 8, wherein the third function definition comprises parameters based on variables used by the data manipulation code from the second function definition.

10. The non-transitory computer-readable medium of claim 8, wherein the operations further comprise:

generating a fourth function definition in the second object, wherein the fourth function definition overrides the third function definition in the first object;
copying the data manipulation code into the fourth function definition; and
causing the data manipulation code to manipulate the data at the third data source.

11. The non-transitory computer-readable medium of claim 1, wherein the first data source and the second data source are the same data source.

12. The non-transitory computer-readable medium of claim 1, wherein the query language comprises Standard Query Language (SQL), and wherein the procedural language extension of the query language comprises PL/SQL.

13. The non-transitory computer-readable medium of claim 1, wherein generating the second definition of the package comprises:
identifying data types and variables that are private in the first definition of the package; and
causing the data types and the variables to be global in the second definition of the package.

14. The non-transitory computer-readable medium of claim 1, wherein generating the second definition of the package comprises:
copying declarations of public functions and procedures from the first definition of the package into the second definition of the package.

15. The non-transitory computer-readable medium of claim 14, wherein the public functions and procedures in the second definition of the package call corresponding functions and procedures in either the first object or the second object depending on the determination of whether to use the second data source or to use the third data source.

16. The non-transitory computer-readable medium of claim 15, wherein the operations further comprise:
passing parameters received by the public functions and procedures in the second definition of the package that are supported by the query language to the corresponding functions and procedures in either the first object or the second object; and
storing parameters received by the public functions and procedures in the second definition of the package that are not supported by the query language in global variables.

17. The non-transitory computer-readable medium of claim 15, wherein the operations further comprise:
declaring variables for any return types that are returned by the public functions and procedures in the second definition of the package that are not supported by the query language;
receiving return values from the corresponding functions and procedures in either the first object or the second object;
storing the return values in the variables; and
returning the variables from the public functions and procedures in the second definition of the package.

18. A system comprising:
one or more processors; and
one or more memory devices comprising instructions that, when executed by the one or more processors, cause the one or more processors to perform operations comprising:
accessing a first definition of a package that manipulates data at a first data source using a procedural language extension of a query language;
generating a definition of a first object that manipulates data at a second data source;
generating a definition of a second object that inherits from the first object, wherein the definition of the second object overrides a portion of the definition of the first object that manipulates the data at the second data source to instead manipulate data at a third data source;
accessing a session variable that is settable at runtime and indicates whether to use the second data source or to use the third data source; and
generating a second definition of the package that instantiates either the first object or the second object based on whether the session variable indicates using the second data source or to use the third data source.

19. A method of automatically using an existing package definition to automatically generate a new package definition that selects data sources at runtime, the method comprising:
accessing a first definition of a package that manipulates data at a first data source using a procedural language extension of a query language;
generating a definition of a first object that manipulates data at a second data source;
generating a definition of a second object that inherits from the first object, wherein the definition of the second object overrides a portion of the definition of the first object that manipulates the data at the second data source to instead manipulate data at a third data source;
accessing a session variable that is settable at runtime and indicates whether to use the second data source or to use the third data source; and
generating a second definition of the package that instantiates either the first object or the second object based on whether the session variable indicates using the second data source or to use the third data source.

* * * * *

UNITED STATES PATENT AND TRADEMARK OFFICE
CERTIFICATE OF CORRECTION

PATENT NO. : 11,163,538 B2  
APPLICATION NO. : 16/742742  
DATED : November 2, 2021  
INVENTOR(S) : Villegas et al.

Page 1 of 1

It is certified that error appears in the above-identified patent and that said Letters Patent is hereby corrected as shown below:

In the Claims

In Column 30, Line 14, in Claim 2, delete "on the" and insert -- on --, therefor.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*